(12) United States Patent
Sleiman et al.

(10) Patent No.: US 10,649,780 B2
(45) Date of Patent: May 12, 2020

(54) DATA PROCESSING APPARATUS AND METHOD FOR EXECUTING A STREAM OF INSTRUCTIONS OUT OF ORDER WITH RESPECT TO ORIGINAL PROGRAM ORDER

(71) Applicant: THE REGENTS OF THE UNIVERSITY OF MICHIGAN, Ann Arbor, MI (US)

(72) Inventors: Faissal Mohamad Sleiman, Ann Arbor, MI (US); Thomas Friedrich Wenisch, Ann Arbor, MI (US)

(73) Assignee: The Regents of the University of Michigan, Ann Arbor, MI (US)

( * ) Notice: Subject to any disclaimer, the term of this patent is extended or adjusted under 35 U.S.C. 154(b) by 80 days.

(21) Appl. No.: 15/128,214

(22) PCT Filed: Mar. 18, 2015

(86) PCT No.: PCT/US2015/021217
§ 371 (c)(1),
(2) Date: Sep. 22, 2016

(87) PCT Pub. No.: WO2015/153121
PCT Pub. Date: Oct. 8, 2015

(65) Prior Publication Data
US 2017/0109172 A1 Apr. 20, 2017

Related U.S. Application Data

(63) Continuation-in-part of application No. 14/231,820, filed on Apr. 1, 2014, now abandoned.

(51) Int. Cl.
*G06F 9/38* (2018.01)
*G06F 9/30* (2018.01)

(52) U.S. Cl.
CPC ........ *G06F 9/3838* (2013.01); *G06F 9/30098* (2013.01); *G06F 9/384* (2013.01); *G06F 9/3836* (2013.01); *G06F 9/3851* (2013.01)

(58) Field of Classification Search
CPC ...... G06F 9/384; G06F 9/3842; G06F 9/3838; G06F 9/3836; G06F 9/3851; G06F 9/30087; G06F 9/3004; G06F 9/30043
See application file for complete search history.

(56) References Cited

U.S. PATENT DOCUMENTS

| 5,590,295 A | 12/1996 | Deosaran |
| 5,941,983 A * | 8/1999 | Gupta ................... G06F 9/3836 712/214 |

(Continued)

OTHER PUBLICATIONS

John Hennessy & David Patterson, Computer Architecture: A Quantitative Approach, 2003, Morgan Kaufmann, third edition, pp. 177-178.*

(Continued)

*Primary Examiner* — William B Partridge
*Assistant Examiner* — Courtney P Carmichael-Moody
(74) *Attorney, Agent, or Firm* — Nixon & Vanderhye, P.C.

(57) ABSTRACT

A data processing apparatus and method are provided for executing a stream of instructions out-of-order with respect to original program order. At least some of the instructions in the stream identify one or more architectural registers from a set of architectural registers. The apparatus comprises a plurality of out-of-order components configured to manage execution of a first subset of instructions out-of-order, the plurality of out-of-order components being configured to remove false dependencies between instructions in the first subset. The plurality of out-of-order components include a first issue queue into which the instructions in the first subset are buffered prior to execution. A second issue queue is used (Continued)

to buffer a second subset of instructions prior to execution, the second subset of instructions being constrained to execute in order. Issue control circuitry is configured to reference both issue queues in order to determine an order of execution of instructions, and is configured to constrain the order of execution of the first subset of instructions by true dependencies between the instructions in both the first and second issue queues, and to constrain the order of execution of the second subset of instructions by both the true dependencies and the false dependencies between the instructions in both the first and second issue queues. This approach provides improved performance and/or reduced energy consumption.

22 Claims, 14 Drawing Sheets

(56) References Cited

U.S. PATENT DOCUMENTS

| | | | |
|---|---|---|---|
| 6,112,019 A * | 8/2000 | Chamdani | G06F 9/3836 712/214 |
| 8,407,454 B2 | 3/2013 | Berglas | |
| 2003/0135713 A1 | 7/2003 | Rychlik | |
| 2005/0160203 A1 | 7/2005 | Barrick | |
| 2008/0059765 A1 | 3/2008 | Svendsen et al. | |
| 2012/0124340 A1 | 5/2012 | Hardage | |
| 2012/0204004 A1 * | 8/2012 | Dockser | G06F 9/3814 712/205 |
| 2014/0013085 A1 | 1/2014 | Vats | |
| 2014/0281402 A1 | 9/2014 | Comparan | |
| 2015/0026442 A1 * | 1/2015 | Giroux | G06F 9/3836 712/233 |

OTHER PUBLICATIONS

U.S. Appl. No. 14/231,820, filed Apr. 1, 2014, Inventor: Sleiman et al.
Office Action dated Nov. 2, 2016 in co-pending U.S. Appl. No. 14/231,820, 35 pages.
S. Subramaniam, "Improving Processor Efficiency by Exploiting Common-Case Behaviors of Memory Instructions" May 2009, 212 pages.
J.E. Smith et al, "Implementation of Precise Interrupts in Pipelined Processors," IEEE, Proceedings of the 12th International Symposium on Computer Architecture, Jun. 17-19, 1985, pp. 36-44.
S.J. Eggers et al, "Simultaneous Multithreading: A Platform for Next-Generation Processors" *IEEE Micro*, Sep. 1997, pp. 12-19.
A. Cristal et al, "Toward Kilo-instruction Processors" *ACM Transactions on Architecture and Code Optimization*, vol. 1, No. 4, Dec. 2004, pp. 368-396.
J. Emer, "Simultaneous Multithreading: Multiplying Alpha Performance" www.compaq.com, 1999, 23 pages.
International Search Report and Written Opinion of the International Searching Authority dated Jun. 25, 2015 in PCT/US2015/021217, 9 pages.
International Preliminary Report on Patentability dated Oct. 13, 2016 in in PCT/US2015/021217, 7 pages.
Akkary et al., "Checkpoint Processing and Recovery: Towards Scalable Large Instruction Window Processors", *Proceedings of the 36th Intl Symposium on Microarchitecture—The Computer Society*, Dec. 3-5, 2003, 12 pgs.
Chaudhry et al., "Simultaneous Speculative Threading: A Novel Pipeline Architecture Implemented in Sun's ROCK Processor", ISCA'09, Jun. 20-24, 2009, pp. 484-495.
Hilton et al., "CPROB: Checkpoint Processing with Opportunistic Minimal Recovery", *18th Intl Conference on Parallel Architectures and Compilation Techniques*, Sep. 2009, pp. 160-168.
Dundas et al., "Improving Data Cache Performance by Pre-executing Instructions Under a Cache Miss", *ICS 97*, Jul. 7-11, 1997, pp. 68-75.
Hilton et al., "iCFP: Tolerating All-Level Cache Misses in In-Order Processors", *Proceedings—International Symposium on High-Performance Computer Architecture*, Jan. 2009, pp. 431-442.
Hilton et al., "Decoupled Store Completion/Silent Deterministic Replay: Enabling Scalable Data Memory for CPR/CFP Processors", *Dept. of Computer and Information Science, Univ. of Pennsylvania—ISCA '09*, Jun. 20-24, 2009, pp. 245-254.
Lebeck et al., "A Large, Fast Instruction Window for Tolerating Cache Misses", *Proceedings of the 29th Annual international Symposium on Computer Architecture (ISCA '02)*, May 2002, pp. 59-70.
Mutlu et al., "Runahead Execution: An Alternative to Very Large Instruction Windows for Out-of-order Processors", *Proceedings of the Ninth Intl Symposium on High-Performance Computer Architecture (HPCA-9 '03)—IEEE* 2002, Feb. 8, 2003, 12 pgs.
Palachara et al., "Complexity-Effective Superscalar Processors", *ISCA '97*, Jun. 1-4, 1997, pp. 206-218.
Pericas et al., "A Decoupled KILO-Instruction Processor", *IEEE*, Feb. 2006, pp. 52-63.
Roth, "Physical Register Reference Counting", *IEEE Computer Architecture Letters*, vol. 7, No. 1, Jan.-Jun. 2008, pp. 9-12.
Sarangi et al., "ReSlice: Selective Re-Execution of Long-Retired Misspeculated Instructions Using Forward Slicing", Proceedings of the 38th Annual IEEE/ACM Intl Symposium on Microarchitecture (*MICRO '05*)—*The Computer Society*, Nov. 12-16, 2005, 12 pgs.
Srinivasan et al., "Continual Flow Pipelines", *ASPLOS '04*, Oct. 9-13, 2004, pp. 107-119.
Stark et al., "On Pipelining Dynamic Instruction Scheduling Logic", *IEEE*, Dec. 2000, pp. 1-10.
Vandierendonck et al., "By-Passing the Out-of-Order Execution Pipeline to Increase Energy-Efficient", *CF'07*, May 7-9, 2007, pp. 97-104.
International Search Report for PCT/US2015/021217 dated Jun. 25, 2015, 3 pages.

* cited by examiner

DATA PROCESSING APPARATUS AND METHOD FOR EXECUTING A STREAM OF INSTRUCTIONS OUT OF ORDER WITH RESPECT TO ORIGINAL PROGRAM ORDER

This application is the U.S. national phase of International Application No. PCT/US2015/021217 filed 18 Mar. 2015 which designated the U.S., the entire contents of each of which are hereby incorporated by reference. This application is also a continuation in part application claiming priority to U.S. application Ser. No. 14/231,820 filed 1 Apr. 2014, the entire contents of each of which are hereby incorporated by reference.

BACKGROUND

The present invention relates to a data processing apparatus and method for executing a stream of instructions out-of-order with respect to original program order.

A stream of instructions will have an initial program order, and certain data processing systems are arranged merely to execute the stream of instructions in that original program order. In order to seek to increase performance, data processing systems have been developed that are able to execute instructions out-of-order with respect to original program order. However, when reordering instructions for execution, care has to be taken to ensure that the dependencies between instructions are taken into account. For example, one instruction may need to read as a source operand the contents of a register that is to be written to by an instruction earlier in the instruction stream. It should hence read that register's contents only after the previous instruction has written to the register. Such a dependency is known as a read after write (RAW) hazard. However, there are also other dependencies that occur with respect to the source and destination registers of instructions, such as a write after write (WAW) hazard and a write after read (WAR) hazard. In addition, other dependencies may also exist in the instruction stream. For example, some instructions may be conditionally executed, and as a result it will not be known whether certain later instructions actually need to be executed or not until such conditional instructions have been executed. Such dependencies will be referred to herein as speculation hazards. As another example, certain structural hazards will also exist, in situations where an instruction must stall because the next stage in the processing pipeline is occupied.

In data processing systems that are designed to execute instructions out-of-order, various hardware structures are typically provided which aim to eliminate certain of the hazards that can otherwise restrict the ability to reorder instructions. In particular, the hazards that are eliminated through use of the out-of-order hardware components will be referred to herein as false hazards (or false dependencies). Conversely, any remaining hazards which are not eliminated by the out-of-order hardware components will be referred to herein as true hazards (or true dependencies).

Two types of false hazards which can be removed by such out-of-order hardware components are the earlier mentioned WAR and WAW hazards. These can be addressed by employing as one of the out-of-order hardware components register renaming circuitry to map the architectural registers specified by the instructions to a larger set of buffer entries within a result buffer, the result buffer also forming one of the out-of-order hardware components. Further, another out-of-order hardware component that is often provided is a reorder buffer, which in combination with the result buffer can be used to remove speculation hazards as another form of false hazard. To deal with structural hazards (another false hazard), an issue queue is typically used, providing a window of instructions that can be issued for execution, effectively the issue circuitry being able to issue instructions dynamically from anywhere in the instruction window. By removing such false dependencies, the out-of-order hardware components then provide a great deal of flexibility as to how the instructions are reordered in order to seek to improve performance of the data processing apparatus. All that remains is to check for any true dependencies, and ensure that those true dependencies are no longer present in respect of any instructions issued. An example of a true dependency is the earlier mentioned RAW dependency.

Whilst such out-of-order hardware components provide the above benefits, they are relatively costly to implement, and consume significant energy. In addition, to improve performance further, it is typically necessary to increase the size of these out-of-order hardware components, to effectively increase the size of the instruction window from which instructions can be selected for execution.

It would be desirable to provide an improved mechanism for executing a stream of instructions out-of-order with respect to original program order, which enabled improved performance and/or energy savings when compared with the above described known technique.

SUMMARY

Viewed from a first aspect, the present invention provides a data processing apparatus for executing a stream of instructions out of order with respect to original program order, said stream including instructions that identify one or more architectural registers from a set of architectural registers, the data processing apparatus comprising: a plurality of out of order components configured to manage execution of a first subset of said instructions out of order, said plurality of out of order components configured to remove false dependencies between instructions in said first subset, and said plurality of out of order components including a first issue queue into which the instructions in said first subset are buffered prior to execution; a second issue queue into which a second subset of said instructions are buffered prior to execution, said second subset of instructions being constrained to execute in order; and issue control circuitry configured to reference the first issue queue and the second issue queue in order to determine an order of execution of instructions from both the first and second queues, the issue control circuitry being configured to constrain the order of execution of said first subset of instructions by true dependencies between the instructions in both the first and second issue queues, and to constrain the order of execution of said second subset of instructions by both the true dependencies and the false dependencies between the instructions in both the first and second issue queues.

The data processing apparatus is arranged to execute a stream of instructions out of order with respect to original program order. At least some (but not necessarily all) of the instructions in the stream identify one or more architectural registers from a set of architectural registers. In accordance with the present invention, the stream of instructions is considered to consist of two subsets, namely a first subset of instructions that fully utilise the out-of-order components, and are hence executed out-of-order, and a second subset of components that are constrained to execute in order. The out-of-order components remove the false dependencies, and out-of-order execution is where an instruction proceeds past a false dependency without stalling/waiting for it (given that the out-of-order components have alleviated the constraints of those false dependencies). Conversely instructions that execute in order carry out the stages of execution such as reading registers and writing back results only after both true and false dependencies have passed. Hence, the second subset of instructions execute in order with respect to each other, but also in order with respect to any instructions in the first subset that appear earlier in the instruction stream than they do.

Whereas the instructions in the first subset are placed within a first issue queue, the instructions in the second subset are placed into a second issue queue. Dependency checking is performed by issue control circuitry which references the first and second issue queues in order to determine an order of execution of instructions from both queues. This issue control circuitry is configured to constrain the order of execution of the first subset of instructions by any true dependencies that may exist for those instructions (such true dependencies may exist due to instructions in either of the queues). Furthermore, the issue control circuitry constrains the order of execution of the second subset of instructions to take account of both true dependencies and false dependencies associated with instructions in the second subset. The true and false dependencies may occur due to other instructions in the second subset, or indeed due to instructions in the first subset.

By enabling the issue control circuitry to check for false dependencies of instructions in the second subset, the instructions in the second subset can avoid use of much of the out-of-order components provided within the data processing apparatus, thereby reducing energy consumption of the data processing apparatus. Further, since some of the instructions are allocated to the second issue queue for execution in order, this increases the effective instruction window for the instructions being executed out-of-order at a lower cost than equivalent scaling of the out-of-order hardware components to provide such an increased instruction window.

The inventors of the present invention realised that a significant number of the instructions executed by known out-of-order processors end up not being reordered, and hence effectively execute in order. Hence, the cost and complexity of using the out-of-order hardware components to process those instructions is wasted, since the false hazards that such out-of-order hardware components seek to remove will effectively be removed anyway, by virtue of the instructions being executed in order. The inventors then developed the apparatus of the present invention as a mechanism for allowing a certain subset of instructions to be constrained to execute in order, and hence bypass much of the complexity of the out-of-order components, thereby alleviating the pressure on the out-of-order hardware components and providing a more energy efficient path for instruction execution.

Whilst the first issue queue may be formed from a single physical queue, in alternative embodiments the first issue queue may be embodied by a plurality of split issue queues, effectively providing multiple different structures for different types of instructions.

In one embodiment the plurality of out of order components further comprise a plurality of buffer entries, and renaming circuitry configured to map at least a subset of the architectural registers in said set of architectural registers to buffer entries in said plurality of buffer entries, the number of buffer entries in said plurality of buffer entries exceeding the number of architectural registers in said at least a subset of the architectural registers. The data processing apparatus further comprises tag value generation circuitry configured to provide a tag value uniquely identifying each instruction in said first and second issue queues, which is then used as a mechanism for enabling dependencies to be checked prior to instructions being issued from either of the queues. The issue control circuitry is then configured to make reference to at least the tag values in order to constrain the order of execution of said first subset and said second subset of instructions.

It should be noted that whilst in one embodiment all of the architectural registers in the set of architectural registers may be subjected to renaming, this is not a requirement, and in alternative embodiments one or more of the architectural registers may not be subject to renaming. In either event, the number of buffer entries provided exceeds the number of architectural registers that can be subjected to renaming.

The renaming circuitry can be configured in a variety of ways. However, in one embodiment, the renaming circuitry is configured to map the architectural registers to the buffer entries such that for multiple pending instructions in said first subset that specify a same destination architectural register, those multiple instructions are allocated different destination buffer entries. The renaming circuitry is further configured, for each instruction in the second subset, to map that instruction's specified destination architectural register to the same buffer entry last allocated to an instruction from the first subset that specified the same destination architectural register. Hence, in accordance with this embodiment, each instruction in the second subset does not consume an additional buffer entry, thereby alleviating constraints on the size of the structure providing the buffer entries, e.g. a result buffer. The result generated by execution of an instruction in the second subset can safely overwrite the buffer entry contents produced by an instruction from the first subset, since the issue control circuitry ensures that an instruction in the second subset is only issued for execution once any associated true and false dependencies are no longer present.

The tag value generation circuitry can take a variety of forms, but in one embodiment forms part of the renaming circuitry.

In particular, in one embodiment, the renaming circuitry comprises a mapping table identifying architectural register to buffer entry mappings for pending instructions, and a free list identifying available buffer entries. The mapping table further comprises, for each architectural register to buffer entry mapping, the tag value to identify a most recent pending instruction associated with that buffer entry. That most recent pending instruction may be an instruction from the first subset that has been allocated that buffer entry, or an instruction from the second subset that has been assigned to that buffer entry, that buffer entry having already been allocated to an instruction from the first subset that specified the same destination architectural register.

The tag values can be generated in a variety of ways. However, in one embodiment, if the most recent pending instruction associated with a buffer entry is an instruction from the first subset, the corresponding tag value is set equal to an identifier for that buffer entry. Hence, for instructions in the first subset, the unique tag is provided by the identifier for the buffer entry allocated to that instruction (in particular, in one embodiment, the buffer entry allocated to store the result generated by that instruction).

As mentioned earlier, in one embodiment, instructions in the second subset are not allocated their own separate buffer entry, but instead are given the same buffer entry as previously allocated to an instruction in the first subset that specified the same destination architectural register. Hence the buffer entry identifier would not provide a unique tag value for such an instruction from the second subset. In accordance with one embodiment, this is addressed by arranging that, if the most recent pending instruction associated with a buffer entry is an instruction from the second subset, the corresponding tag value is set equal to an identifier value allocated to that instruction by the renaming circuitry to uniquely identify each pending instruction in the second issue queue. This hence enables a distinction to be made between instructions in the first subset and instructions in the second subset, even if those instructions share the same destination buffer entry.

In one embodiment, the renaming circuitry additionally comprises a further free list of identifier values available to allocate to instructions in the second subset. This provides a pool of identifier values that can be allocated to instructions from the second subset, as those instructions are considered by the renaming circuitry.

In one embodiment, the first issue queue is configured such that the issue control circuitry can select for execution any instruction buffered in the first issue queue that has no true dependencies remaining.

However, in contrast, in one embodiment the second issue queue is a first-in-first-out (FIFO) queue, and the issue control circuitry is configured to select for execution one or more instructions at a head of the FIFO queue once said one or more instructions have no true dependencies and no false dependencies remaining. The FIFO nature of the second issue queue ensures the in order execution of instructions in the second subset, the issue control circuitry then checking for any true or false dependencies that may exist due to instructions in the first issue queue.

In one embodiment, the issue control circuitry is configured to maintain dependency data identifying dependencies for each instruction in the first and second issue queues, and is responsive to each instruction issued for execution from the first and second issue queues, to update the dependency data based on the tag value of the issued instruction.

The dependency data can take a variety of forms. However, in one embodiment, the dependency data includes a ready bitvector. In particular, in one embodiment, the issue control circuitry comprises a ready bitvector storage providing a ready indication for each tag value, the ready indication being set once the instruction identified by that tag value has produced its result, and being referenced by the issue control circuitry to determine, for each instruction from the second subset, when a true dependency in the form of a read after write (RAW) hazard no longer exists. Hence, such an approach can be used to check availability of the source operands for the instructions, in order to ensure that those source operands are available before an instruction is issued. This hence enables the RAW true dependency to be checked before an instruction is issued.

The RAW true dependency has to be checked for all instructions, whether in the first issue queue or the second issue queue. Whilst the ready bitvector storage could in one embodiment be used when performing the check for both instructions in the first issue queue and instructions in the second issue queue, typically the first issue queue will separately maintain ready flags in connection with the source operands, and accordingly in such embodiments the ready bitvector storage is only referenced when checking true dependencies for instructions in the second issue queue.

In one embodiment, the ready bitvector storage is also used to check for certain false dependencies. In particular, in one embodiment, the second issue queue is configured to store in association with each instruction both the tag value allocated for that instruction, and the tag value allocated for a preceding instruction that used the same buffer entry for the destination architectural register, and the issue control circuitry is configured to reference the ready bitvector storage in order to determine, for each instruction in the second issue queue, when a false dependency in the form of a write after write (WAW) hazard no longer exists. Due to the unique nature of the tag values, this provides an effective mechanism for checking whether the WAW still exists or not. An instruction in the second issue queue will not be issued until the WAW no longer exists.

The issue control circuitry can be configured in a variety of ways in order to check other false dependencies. However, in one embodiment, the stream of instructions is sectioned into a plurality of instruction runs, each instruction run comprising a block of instructions in original program order comprising one or more instructions in the first subset followed by one or more instructions in the second subset. The issue control circuitry comprises a run management table maintaining data associated with each instruction run that is referenced by the issue control circuitry to determine for each instruction in the second issue queue, when one or more false dependencies no longer exist.

The use of the concept of instruction runs can be used to ensure the required in order execution, and accordingly remove certain false dependencies.

In one embodiment, the issue control circuitry is configured to reference the run management table in order to ensure an instruction in the second subset is not issued from the second issue queue until a false dependency in the form of a write after read (WAR) hazard no longer exists.

There are a number of ways in which the issue control circuitry can achieve this. In one embodiment, the run management table comprises a count value for each instruction run, as each instruction in the first subset is buffered in the first issue queue, the count value for the corresponding instruction run being adjusted in a first direction, and as each instruction is issued from the first issue queue for execution, the count value for the corresponding instruction run being adjusted in a second direction (the reverse direction to the first direction). The issue control circuitry is then configured to prevent an instruction in the second issue queue being issued for execution whilst the count value for the corresponding instruction run does not have a predetermined value. Such an approach enforces the in order execution of the instructions within the second subset within a particular instruction run, since all of the instructions in the first subset within that particular instruction run will need to have issued before any of the instructions of the second subset within the same instruction run can be issued.

In one embodiment the predetermined value that the count value must have before the issue control circuitry allows an instruction in the second issue queue to be issued is a zero value. However, it will be appreciated that in alternative embodiments the counting mechanism can be arranged differently so that a non zero value is used as the predetermined value.

In one embodiment, the second issue queue is a first-in-first-out (FIFO) queue, and by configuring the issue control circuitry to prevent an instruction in the second issue queue being issued for execution whilst the count value for the corresponding instruction run does not have a predetermined value, this ensures that the issue control circuitry will not issue an instruction from a head position of the FIFO until a false dependency in the form of a write after read (WAR) hazard no longer exists. In particular, whilst the count value mechanism ensures in order execution within a particular instruction run, the FIFO nature of the second issue queue also ensures in order execution between runs, since an instruction in a particular instruction run will only reach the head of the FIFO once all of the instructions in the FIFO relating to earlier instruction runs have been issued.

The run management table mechanism can also be used to manage speculation hazards. In particular, in one embodiment, the issue control circuitry is configured to reference the run management table in order to ensure that an instruction in the second subset is not able to write back its result to a destination buffer entry until a false dependency in the form of an unresolved speculation no longer exists.

There are a number of ways in which this can be achieved. However, in one embodiment, the run management table comprises a delay count value for each instruction run, the delay count value identifying a remaining time until all outstanding speculations in relation to issued instructions from the associated instruction run have been resolved. The second issue queue maintains a delay indication for each instruction indicative of a delay between issuing that instruction and that instruction reaching a predetermined stage of execution associated with speculation resolution, the issue control circuitry being configured to prevent an instruction in the second issue queue being issued for execution if its associated delay indication is less than the delay count value for the instruction run to which that instruction belongs.

In one embodiment, the predetermined stage of execution is the write back stage. Through use of the delay count mechanism, the issue control circuitry can ensure that any instruction issued from the second issue queue will not reach the write back stage until any associated speculation hazard has been resolved. Accordingly, execution of the instruction can be culled if necessary at that point, without it overwriting any result in the destination buffer entry.

There are a number of ways in which the delay count value can be maintained within the run management table. However, in one embodiment, both the instructions in the first issue queue and the instructions in the second issue queue have delay indications associated therewith, the issue control circuitry is configured to update the delay count value for an instruction run and all subsequent instruction runs if an instruction from that instruction run is issued for execution that has a delay indication larger than the current delay count value, and is further configured to decrement the delay count value each execution cycle.

The buffer entries may be provided within a result buffer (which may consist of one or more separate structures). The result buffer can take a variety of forms. For example, in one embodiment the result buffer may take the form of a result queue, whilst in another embodiment the result buffer comprises a physical register file where each buffer entry comprises a physical register within the physical register file.

Viewed from a second aspect, the present invention provides a method of executing a stream of instructions out of order with respect to original program order within a data processing apparatus, said stream including instructions that identify one or more architectural registers from a set of architectural registers, the method comprising: employing a plurality of out of order components to manage execution of a first subset of said instructions out of order, said plurality of out of order components configured to remove false dependencies between instructions in said first subset, and said plurality of out of order components including a first issue queue into which the instructions in said first subset are buffered prior to execution; employing a second issue queue into which a second subset of said instructions are buffered prior to execution, said second subset of instructions being constrained to execute in order; and referencing the first issue queue and the second issue queue in order to determine an order of execution of instructions from both the first and second queues, constraining the order of execution of said first subset of instructions by true dependencies between the instructions in both the first and second issue queues, and constraining the order of execution of said second subset of instructions by both the true dependencies and the false dependencies between the instructions in both the first and second issue queues.

Viewed from a third aspect, the present invention provides a data processing apparatus for executing a stream of instructions out of order with respect to original program order, said stream including instructions that identify one or more architectural registers from a set of architectural registers, the data processing apparatus comprising: a plurality of out of order component means for managing execution of a first subset of said instructions out of order, said plurality of out of order component means for removing false dependencies between instructions in said first subset, and said plurality of out of order component means including a first issue queue means into which the instructions in said first subset are buffered prior to execution; a second issue queue means into which a second subset of said instructions are buffered prior to execution, said second subset of instructions being constrained to execute in order; and issue control means for referencing the first issue queue means and the second issue queue means in order to determine an order of execution of instructions from both the first and second queue means, the issue control means further for constraining the order of execution of said first subset of instructions by true dependencies between the instructions in both the first and second issue queue means, and for constraining the order of execution of said second subset of instructions by both the true dependencies and the false dependencies between the instructions in both the first and second issue queue means.

BRIEF DESCRIPTION OF THE DRAWINGS

The present invention will be described further, by way of example only, with reference to embodiments thereof as illustrated in the accompanying drawings, in which.

DESCRIPTION OF EXAMPLE EMBODIMENTS

Figure 1:
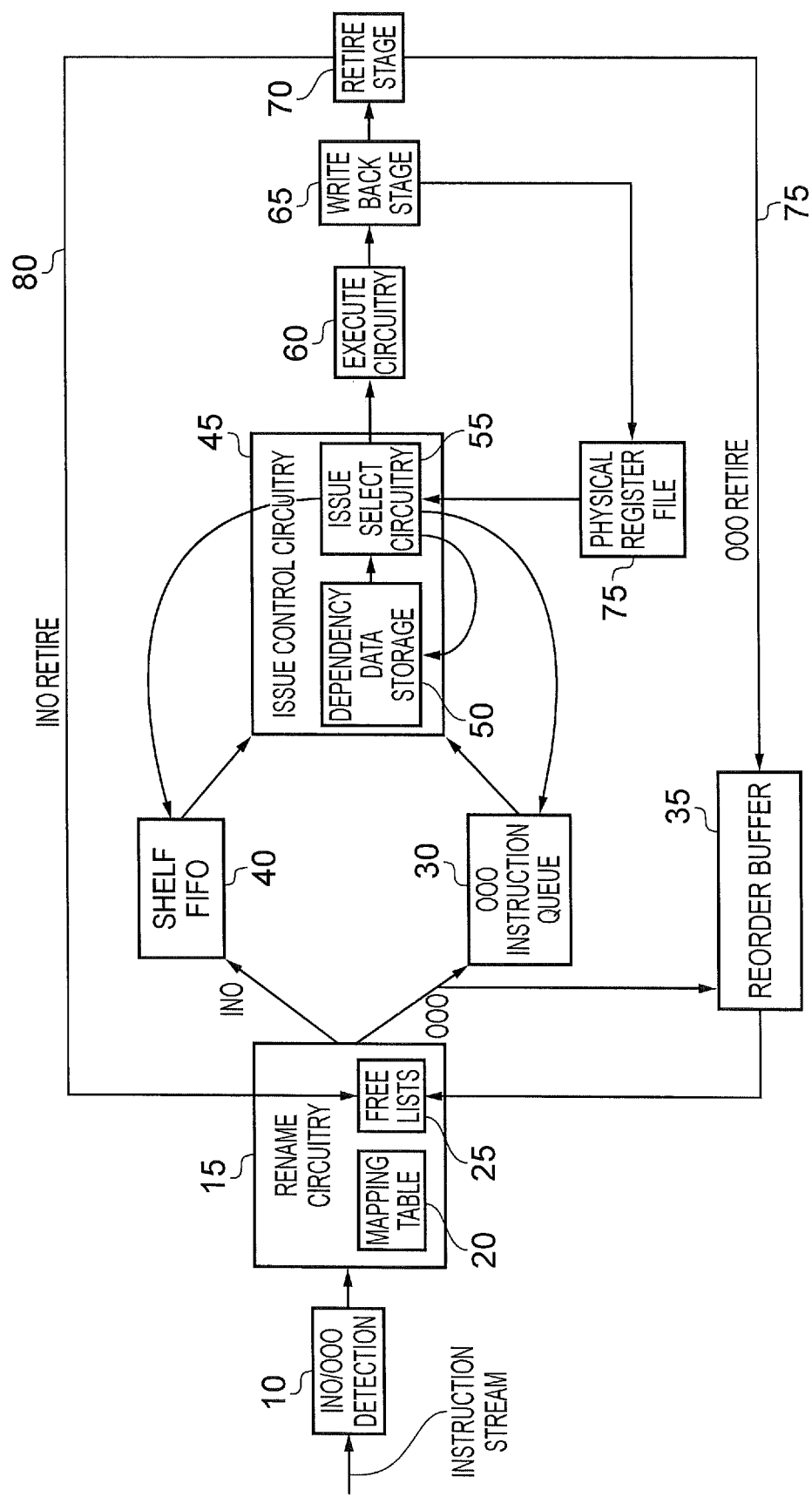
FIG. 1 is a block diagram of a data processing apparatus in accordance with one embodiment.

FIG. 1 is a block diagram of a data processing apparatus in accordance with one embodiment. A stream of instructions is provided as an input to the apparatus, the instructions appearing in the instruction stream in original program order. For each instruction in the instruction stream, the in order (INO)/out of order (OOO) detector 10 determines whether the instruction should form part of a first subset of the instructions that are allowed to be executed out of order within the data processing apparatus, or should be part of a second subset of instructions constrained to execute in order. The instructions in the second subset are constrained to execute in order not only with respect to the other instructions in the second subset, but also in respect of any instructions in the first subset that appear earlier in the instruction stream. The inventors of the present invention realised that in many known out of order implementations a significant number of instructions (for example approximately 30% in some situations) input to an out-of-order processor actually end up being processed in original program order. As a result, whilst those instructions pass through the various out-of-order hardware components within the out-of-order processor, the associated energy consumption is wasted, since whilst the out-of-order hardware components serve to remove false dependencies so that instructions can be reordered solely taking account of any remaining true hazards, for instructions that actually end up being processed in order, the false dependencies will in any case have been resolved by the time those instructions execute.

The data processing apparatus of the described embodiment has been designed to take advantage of this realisation, by providing an alternative route through the data processing apparatus. This is used by a subset of instructions that are then constrained to execute in order, this alternative route avoiding use of a significant amount of the out-of-order hardware components provided to facilitate out-of-order execution. As a result, this reduces the energy consumption of the apparatus. It can also lead to an increase in performance, by providing an effective increase in the instruction window from which instructions can be issued for execution.

There are a number of ways in which the detector 10 can determine whether an instruction is within the first subset to be executed out-of-order, or within the second subset to be constrained to execute in order. For example, in one embodiment, this information could be directly encoded in the instructions of the instruction stream, for example this information being added by the compiler during compilation of the program defined by the instruction stream. Alternatively, the detector could employ a prediction mechanism to predict which instructions should be constrained to execute in order, for example based on feedback produced by previous execution of the instructions.

For example, the circuitry could track whether false dependencies for a particular instruction tend to clear before any true dependencies. If so, then such an instruction would be a good candidate for placing within the second subset of instructions. Conversely, if the true dependencies for an instruction tend to be cleared before any false dependencies, then such an instruction should be treated as an out-of-order instruction, so that the out-of-order hardware components can remove the false dependencies to thereby allow such an instruction to be executed earlier than would otherwise be possible, thereby increasing performance.

The instructions of the instruction stream are then passed through the rename circuitry 15, each instruction having sideband information identifying whether it is in the first subset or the second subset.

The general operation of rename circuitry within out-of-order processors will be well understood by those of skill in the art. The rename circuitry serves to map the architectural registers specified by an instruction as source and destination registers to corresponding buffer entries within a result buffer. The result buffer can take a variety of forms, for example a result queue or a physical register file. In the example illustrated in FIG. 1, the result buffer takes the form of the physical register file 75, the physical register file containing a plurality of physical registers, where the number of physical registers exceeds the number of architectural registers specifiable by the instructions. A free list 25 identifies available physical registers within the physical register file 75 that the rename circuitry can allocate during the rename operation. A mapping table 20 is provided identifying for each architectural register a physical register currently mapped to that architectural register.

For the architectural registers specifying source operands, the mapping table is used to identify the appropriate physical registers from which to obtain those source operands. For the architectural registers specified as a destination register, then typically the rename circuitry will allocate a new physical register for that destination register, so that in the event that there are multiple pending instructions that are seeking to write their result to the same architectural register, those multiple pending instructions are each allocated a different physical register in which to write their result. This enables certain false dependencies to be removed, thereby freeing up the out-of-order processor to reorder the execution of those instructions.

The above functionality of the rename circuitry 15 is retained for the first subset of instructions, i.e. the instructions that are to be allowed to be executed out-of-order within the data processing apparatus. Following the rename process, those instructions are then routed to the out-of-order instruction queue 30, and are also allocated an entry within the reorder buffer 35. As will be understood by those skilled in the art, the reorder buffer is essentially a FIFO structure that maintains certain information about the out-of-order instructions until those instructions reach the retire stage. In particular, for each instruction in the reorder buffer, some information is retained about the previous physical register allocated for the destination architectural register. Once an instruction retires, then the entry in the reorder buffer can be removed, and the physical register file information returned to the free list.

As will be discussed in more detail with reference to FIGS. 2A to 4, in accordance with the described embodiment the rename circuitry 15 is adapted to perform a modified operation when handling instructions of the second subset (i.e. the instructions that are to be constrained to execute in order). In particular, for those instructions, the mapping table is again used to identify the physical registers containing the source operands. However, for the architectural register specifying the destination for the result, a new physical register is not allocated for any instruction in the second subset. Due to the fact that the instruction will be constrained to execute in order, it is safe for that instruction to write to the same physical register that has been allocated for a preceding out-of-order instruction in the first subset.

However, for the issue control circuitry 45 to later manage the required dependencies between the instructions in both the first subset and the second subset, there is a need for all of the pending instructions to be uniquely identifiable. Since the above process does not allocate a unique physical register for each destination register, the physical register information cannot uniquely identify the instructions. To address this issue, an additional free list 25 is added, referred to herein as a shelf ID (SID) free list containing available shelf IDs that can be allocated to instructions in the second subset (the term "shelf" is used in association with instructions of the second subset since, as will be discussed later, such instructions are placed in a FIFO referred to herein as a shelf FIFO). The mapping table then contains, in addition to the physical register identifier, a tag value providing a unique identifier for the instruction most recently allocated that physical register as a destination register. If the instruction most recently allocated a physical register is in fact an instruction from the first subset, then the tag value is in one embodiment set equal to the physical register identifier. However, if the instruction most recently allocated a physical register is an instruction in the second subset, then the tag value is set equal to the SID value allocated for that instruction.

Following the renaming process performed in respect of an instruction from the second subset, that instruction is passed to the shelf FIFO 40. Herein, instructions that are placed in the shelf FIFO will be referred to as shelf instructions, whilst instructions placed in the out-of-order instruction queue 30 will be referred to as IQ instructions.

For each shelf instruction in the shelf FIFO 40, not only are the source and destination physical register identifiers and tag values maintained, but also the previously allocated tag value is maintained (i.e. the tag value that was stored within the mapping table in association with the physical register identifier prior to that shelf instruction being processed by the rename circuitry, causing a new tag value to be allocated against the physical register identifier). When a shelf instruction reaches the retire stage 70, then if that previous tag value was in fact one of the shelf identifiers, that shelf identifier is returned to the shelf ID free list over path 80.

Due to the introduction of the shelf identifiers, and the unique tag values, the entry in the reorder buffer 35 is also extended to maintain not only the previous physical register identifier (PRI) value, but also the previous tag value. In one embodiment, the reorder buffer only needs to store the previous tag value if in fact that is an SID value, since otherwise it will be the same as the previous physical register identifier. When an IQ instruction reaches the retire stage, then the reorder buffer will release the previous physical register identifier to the physical register identifier free list, and will also release the previous SID value (if there is one) to the SID free list.

The issue control circuitry 45 contains issue select circuitry 55 arranged to select instructions for execution from both the instruction queue 30 and the shelf FIFO 40. For instructions within the instruction queue 30, the issue select circuitry only needs to ensure that there are no true dependencies preventing an instruction from issuance, and the issue select circuitry 55 can select any of the instructions in the instruction queue 30 that do not have any remaining true dependencies. In one embodiment, the true dependency that is monitored is a RAW dependency, and each entry in the instruction queue 30 maintains a flag for each of its source operands which is set to identify when the associated source operand is available. Accordingly, for any instructions within the instruction queue 30 whose source operands are identified as available, the issue select circuitry 55 can select those instructions for execution.

However, within the shelf FIFO 40 only the instruction (or few instructions depending on the number of instructions that can be issued per cycle) at the head of the FIFO can be considered for issuance. Further, those instructions can only be issued if both the true dependencies and false dependencies are no longer present. In particular, since the instructions in the shelf FIFO have not been subjected to the full processes of the out-of-order hardware components, the false dependencies will not have been removed, and must be considered before those instructions are issued. Details of how these false dependencies are tracked will be discussed in more detail later with reference to FIGS. 5 to 9. However, in general terms, the issue control circuitry 45 includes dependency data storage 50 that maintains certain dependency data that can be referred to by the issue select circuitry 55 when determining whether the instruction at the head of the shelf FIFO 40 is ready to be issued.

Once an instruction is selected for issue by the issue select circuitry 55, the required source operand data will be read from the physical register file 75, and the instruction passed to the execute circuitry 60. At that stage, certain information will also be returned to the shelf FIFO 40 and the instruction queue 30 to enable certain dependency data to be updated therein. Also, information will be returned to the dependency data storage 50 to update dependency data stored therein.

The instructions will be executed within the execute circuitry 60, and at the write back stage 65, this will result in result data being written to the destination physical register within the physical register file 75. Once the instructions then reach the retire stage 70, the earlier described functionality will take place, resulting in certain PRI and/or SID information being returned to the relevant free lists via paths 75, 80. This hence frees up certain information within the physical register file for being over written. In particular, once an instruction has written to a physical register (that physical register being mapped to a particular architectural register), then the previous physical register mapped to that same architectural register is now free to have its contents overwritten.

Figure 2A:
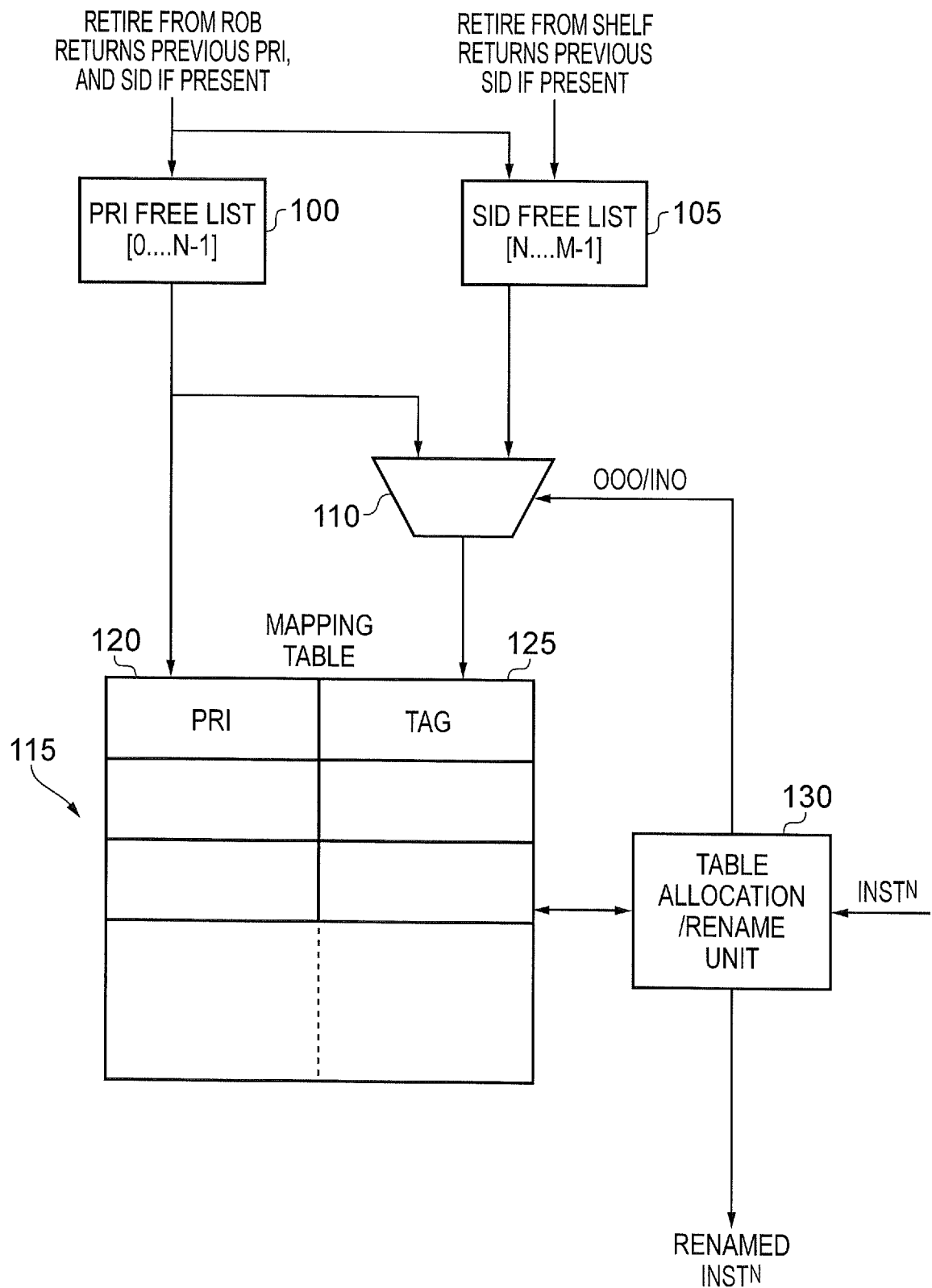
FIG. 2A illustrates the operation of the rename circuitry of FIG. 1 in accordance with one embodiment.

FIG. 2A illustrates the operation of the rename circuitry 15 of FIG. 1 in accordance with one embodiment. Two free lists are provided within the rename circuitry, namely a physical register identifier (PRI) free list 100 and a shelf identifier (SID) free list 105. The mapping table 115 is indexed by the architectural register, and for each architectural register identifies a PRI 120 and a tag value 125. As discussed earlier, the tag value may in fact be a PRI value, or an SID value.

For each received instruction, the table allocation/rename unit 130 sends a control signal to the multiplexer 110 identifying whether the instruction is an out-of-order instruction or an in order instruction. For an out-of-order instruction, the destination architectural register will be mapped to a new physical register, and accordingly an available PRI from the free list 100 will be obtained and stored within the relevant entry of the mapping table. In addition, that PRI value will be routed by multiplexer 110 to be stored as the associated tag value. The previous PRI and tag information that is now being overwritten will be retained for output in association with the renamed instruction.

For an instruction that is to be constrained to be executed in order, then no new PRI will be allocated, but a new SID value will be obtained from the free list 105, and routed via the multiplexer 110 to be stored as the new tag value within the relevant entry of the mapping table. The previous tag value will be retained for output in association with the renamed instruction.

Figure 2B:
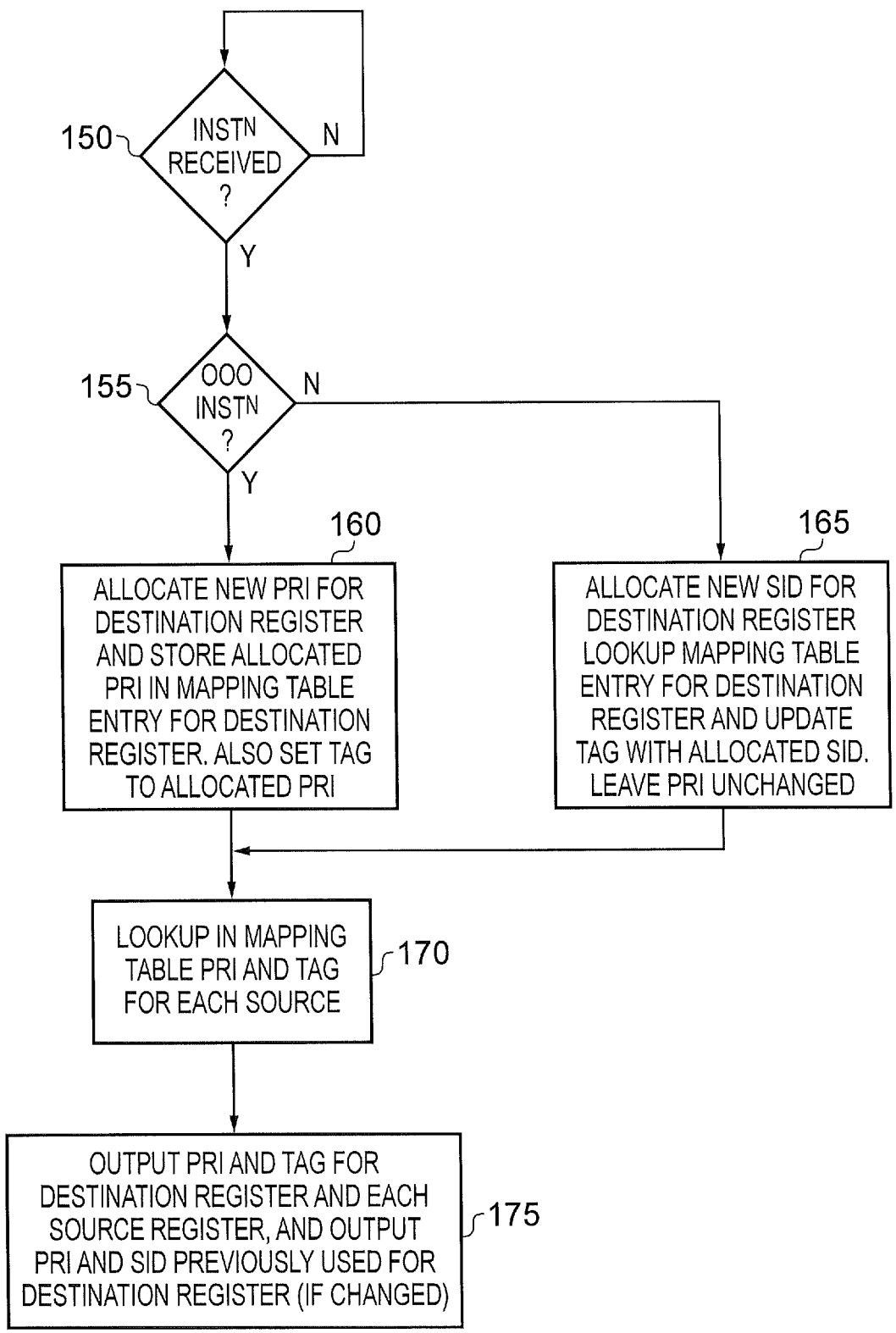
FIG. 2B is a flow diagram illustrating the operation of the circuitry of FIG. 2A in accordance with one embodiment.

FIG. 2B is a flow diagram illustrating the operation of the circuitry of FIG. 2A in accordance with one embodiment. At step 150, it is determined whether there is a new instruction received, and when there is a new instruction, it is then determined at step 155 whether that instruction is an out-of-order instruction. If so, then at step 160 a new PRI will be allocated for the destination register and that new PRI will be stored in the mapping table entry for the destination architectural register. In addition, the tag value will be set equal to the newly allocated PRI value.

Conversely, if it is determined at step 155 that the instruction is not an out-of-order instruction, then the process proceeds to step 165, where a new shelf ID value is allocated for the destination architectural register, and that new SID value is then written to the relevant entry in the mapping table to overwrite the previous tag value. However, the PRI value is left unchanged.

Irrespective of whether step 160 or step 165 is performed, at step 170 a lookup is performed in the mapping table in order to obtain the PRI and tag values for each source operand. Thereafter, at step 175 the PRI and tag information is output as part of the renamed instruction for both the destination register and each source register. In addition, the PRI and SID information previously used for the destination register is output if that information has been changed by the above process.

Figure 3:
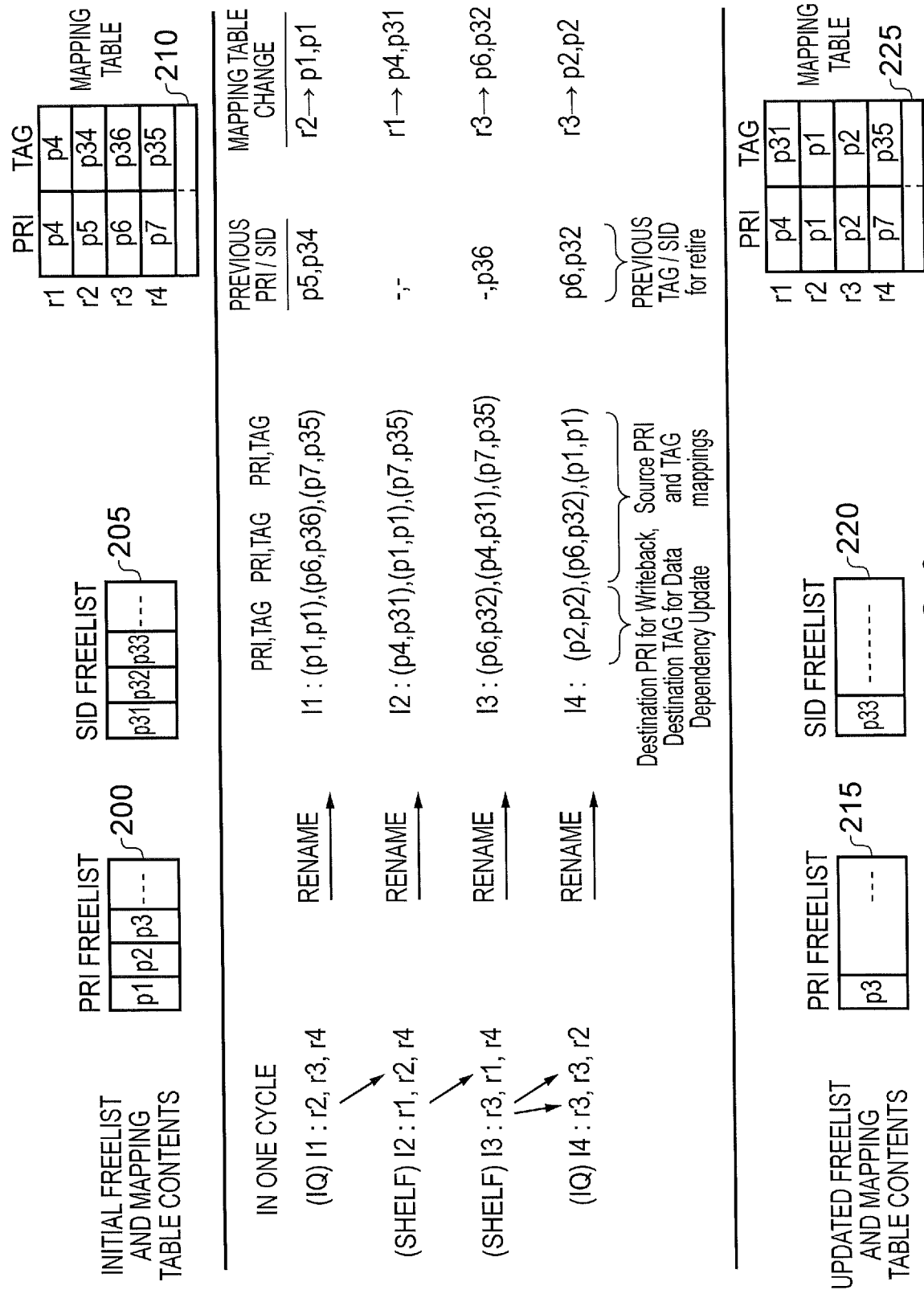
FIG. 3 illustrates the operation of the circuitry of FIG. 2A for a specific example sequence of instructions, in accordance with one embodiment.

This renaming operation is illustrated schematically in FIG. 3, for a specific example. In particular, in this example it is assumed that four instructions I1 to I4 are processed in one cycle, instructions I1 and I4 being IQ instructions, and instructions I2 and I3 being shelf instructions. The first architectural register identified in association with each instruction is the destination register, and the next two registers specify the source architectural registers. RAW and WAW data dependencies are shown by the arrows indicated.

Prior to the renaming, the PRI free list has the contents shown by box 200, and the SID free list has the contents shown by box 205. The box 210 show the initial mapping table contents for the relevant architectural registers.

As shown in FIG. 3, for each IQ instruction, a new PRI value is allocated for the destination register, and the tag value is set equal to the newly allocated PRI value. For each shelf instruction, the destination register retains the current PRI value, but a new SID value is obtained to form the new tag value associated with the destination register.

With regards to the previous PRI and SID information retained, then for IQ instructions the previous PRI information is retained. Further, if the previous tag value was different to the previous PRI, then the previous tag value (effectively the previous SID value) is also retained.

For shelf instructions, the previous PRI information is not needed, since the previous PRI will be the same as the current PRI, given that a new PRI value is not allocated for the destination register. However, if an SID value has been overwritten by the newly allocated SID value, then that previous SID value is retained. As discussed earlier with reference to FIG. 1, this previous PRI and SID information is used at the retire stage in order to return certain PRI values and SID values to the relevant free lists within the rename circuitry.

Considering the PRI and tag information allocated for the destination registers, the PRI information is used at the write back stage to identify the physical register within the physical register file 75 to be written to with the result value. Further, the tag information is used at the time the instruction is issued to allow data dependency update to be performed within the instruction queue 30, the shelf FIFO 40, and the dependency data storage 50.

Following the sequence of renaming operations shown in FIG. 3, then block 215 shows the updated PRI free list, block 220 shows the updated SID free list, and block 225 illustrates the modified contents of the mapping table for the relevant architectural registers.

Figure 4:
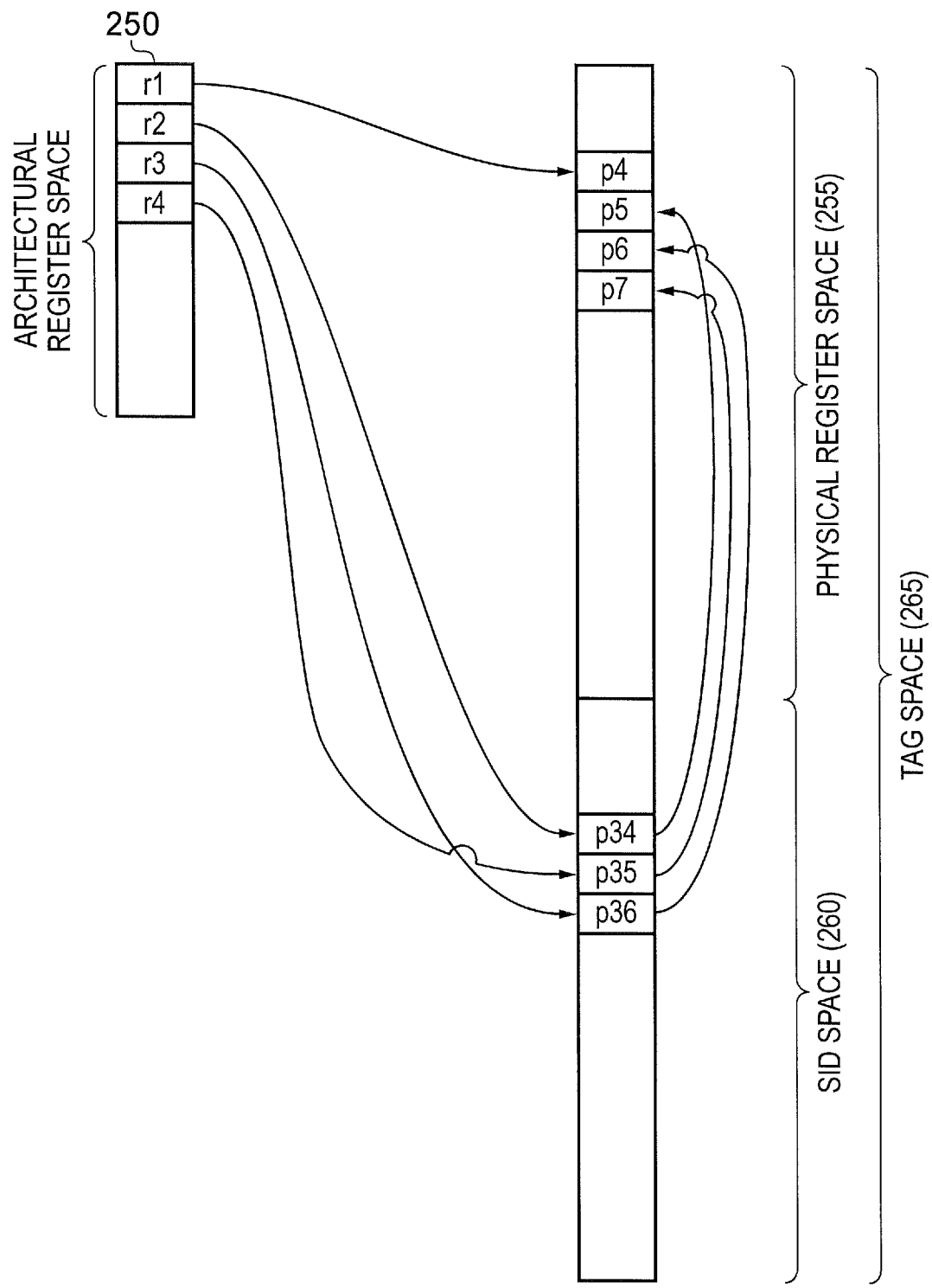
FIG. 4 schematically illustrates how the architectural register space is mapped to the physical register space, and the use of the shelf ID (SID) space in association with the physical register space to create an enlarged tag space, in accordance with one embodiment.

As illustrated in FIG. 4 (which shows the initial mappings represented by the mapping table extract 210 of FIG. 3), through the renaming operation, the architectural register space 250 is mapped to an enlarged physical register space 255. Since each shelf instruction is not allocated a new physical register, the SID space 260 is added to enable a unique mapping to each physical register to be made. Collectively, the physical register space 255 and the SID space 260 form the tag space 265, so that each instruction in the instruction queue 30 and shelf FIFO 40 can be uniquely identified.

Figure 5:
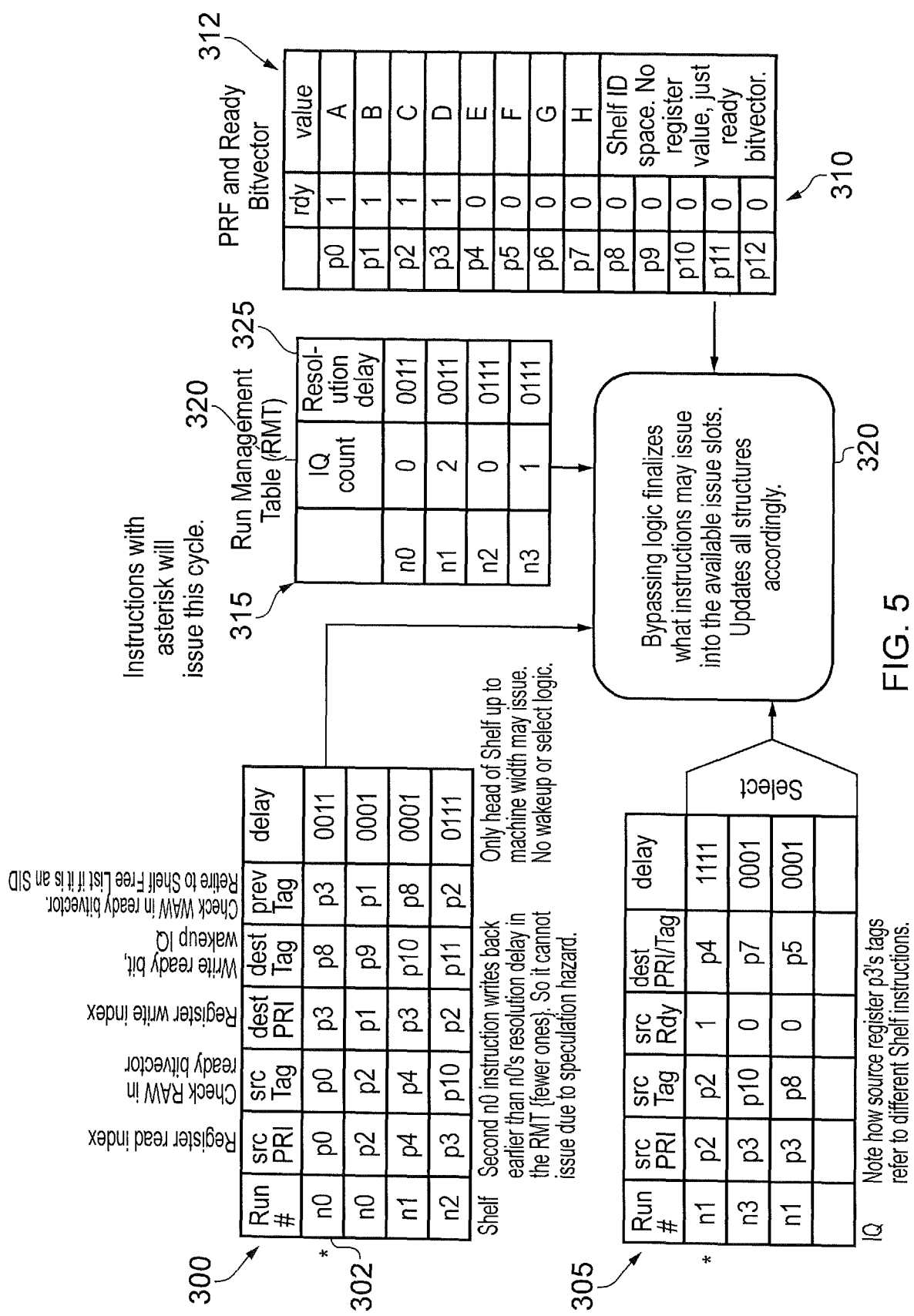
FIG. 5 illustrates in more detail the operation of the issue control circuitry of FIG. 1 in accordance with one embodiment.

FIG. 5 is a diagram illustrating in more detail the issue control circuitry 45 of FIG. 1. Element 300 illustrates information stored in association with some instructions in the shelf FIFO 40, entry 302 representing the instruction at the head of the FIFO. Similarly, element 305 identifies the contents stored in association with some instructions within the instruction queue 30. For ease of illustration, it is assumed in this example that each instruction specifies a single source register and a single destination register. For each instruction within the instruction queue 30, the source PRI and tag value information is stored, along with a source ready flag identifying whether the source operand is available. The destination PRI and tag information is also stored. It will be appreciated from the earlier described operation of the renaming circuitry that for each instruction in the instruction queue, the tag value will be the same as the PRI value. Bypassing logic 320 is provided to identify which instructions may issue into the available issue slots in the execution pipeline. Within the instruction queue, any instruction whose source operands are ready can be issued, and accordingly the instruction marked with an "*" can be issued at this point.

For each instruction within the shelf queue, the source PRI and tag information and the destination PRI and tag information is stored. The previous tag value is also stored, as discussed earlier.

The dependency data storage 50 of FIG. 1 includes a ready bitvector identifying for each tag value whether the instruction identified by that tag value has produced its result. In the example of FIG. 5, this ready bitvector is shown in association with the physical register file contents 312. In this particular example it is assumed that tag values p0 to p7 identify physical registers, and tag values p8 to p12 are actually shelf ID values in the shelf ID space. Accordingly there is no associated physical register value, and only a ready bitvector value for tag values p8 to p12.

For an instruction at the head of the shelf FIFO, the ready bitvector is checked to ensure that all source tag values are identified as being ready, and also that the previous destination tag value is shown as being ready. For the instruction in entry 302, it is hence the case that both the source tag p0 and the previous destination tag p3 need to be set before that instruction can be issued. In the specific example shown in FIG. 5, this is the case, and accordingly that condition is met. By checking the source tag information, this performs a check in respect of the RAW hazard (which is a true hazard). Further, by checking the previous tag information, this enables the WAW hazard to be checked, which is a false hazard (i.e. this hazard could have been removed by the out-of-order hardware components had the instruction been routed through the instruction queue 30).

Figure 7:
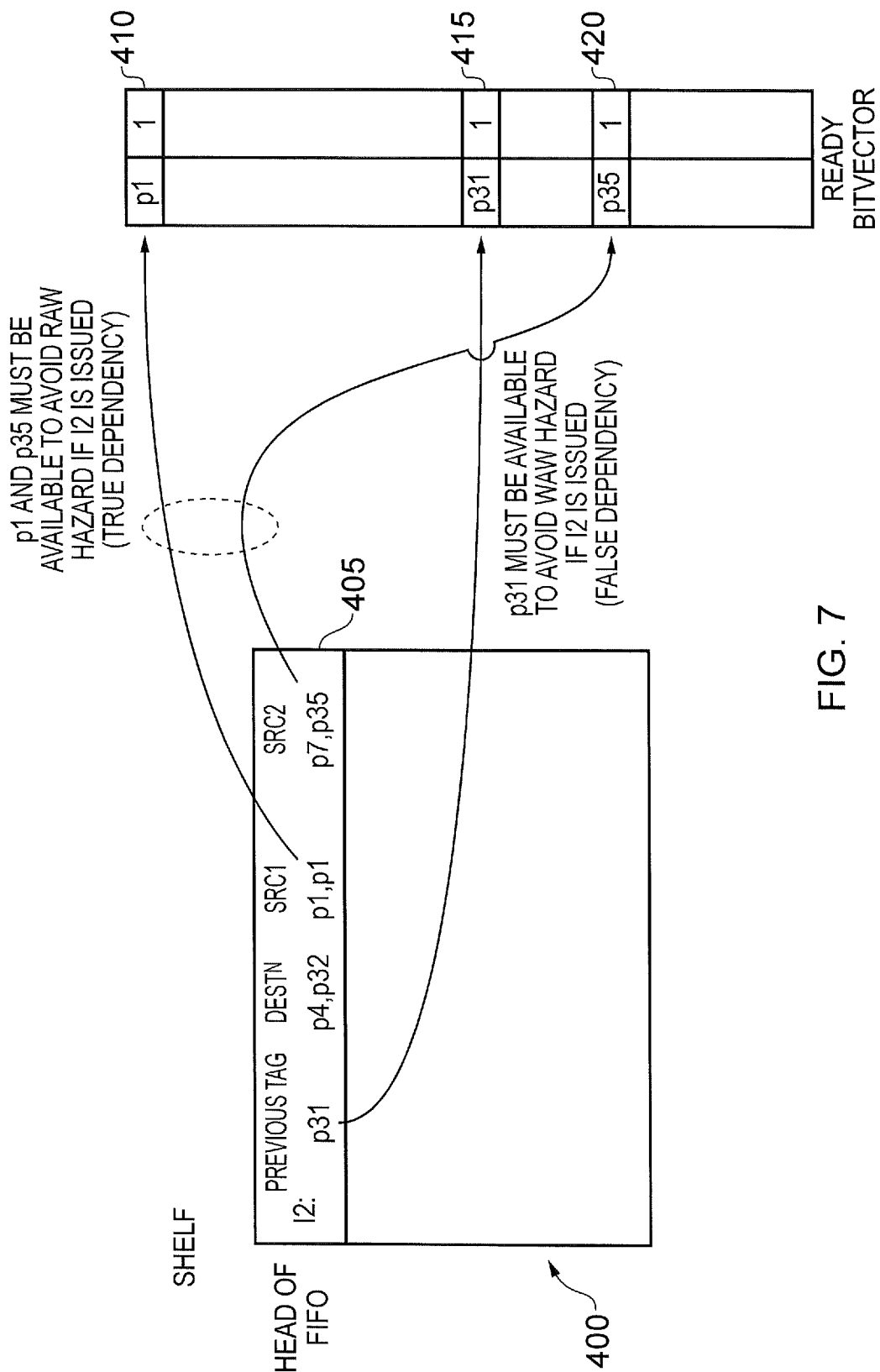
FIG. 7 illustrates how the ready bitvector information is used in accordance with one embodiment.
Figure 8:
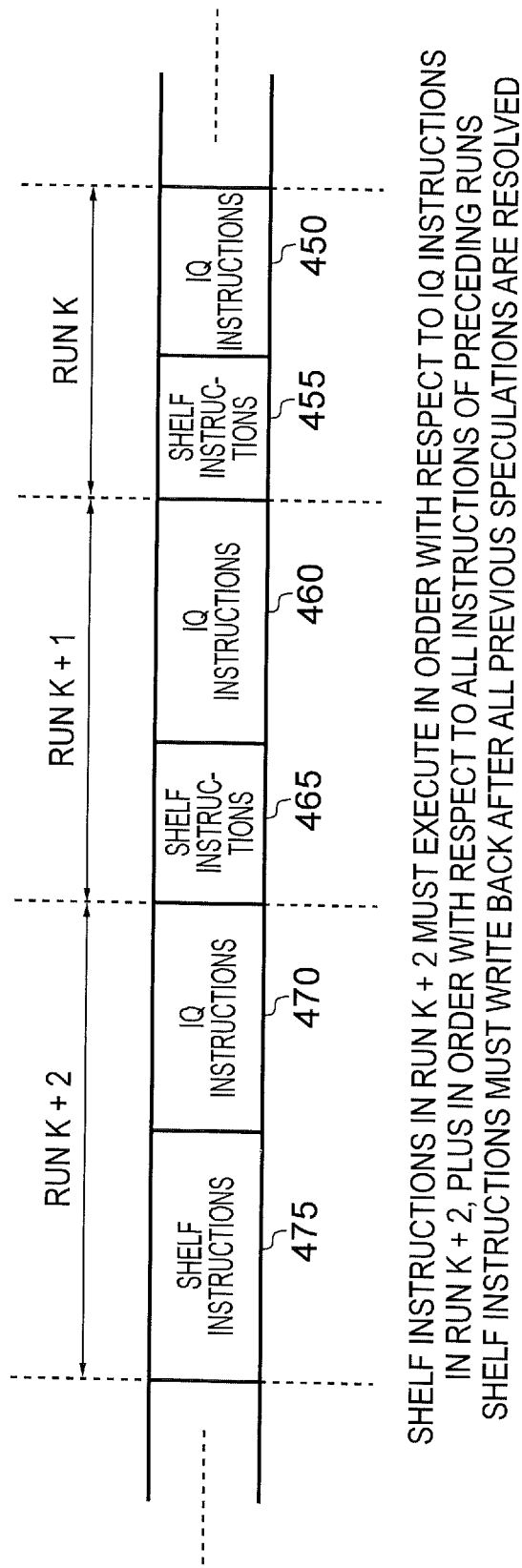
FIG. 8 schematically illustrates how the instruction sequence is sectioned into a plurality of instruction runs, in accordance with one embodiment.

FIG. 7 illustrates the check made against the ready bitvector for entries within the shelf FIFO, for a particular example. In this example, the shelf FIFO 400 contains the entry 405 at the head of the FIFO, in this example the instruction 12 at the head of the FIFO having two source operands and one destination operand. Both of the tag values associated with the source operands have to have their corresponding bit set in the ready bitvector in order to avoid the RAW hazard (i.e. a true dependency). Similarly, the tag of the previous destination (in this case the tag value P31) must have its ready bit set within the ready bitvector in order to avoid a WAW hazard (a false dependency).

As mentioned earlier, there are other false hazards that also need to be taken account of before an instruction in the shelf FIFO can be issued. For example, another false hazard is the WAR hazard. To deal with this hazard, a run management table 315 is maintained within the dependency data storage 50 of the issue control circuitry 45, in particular this maintaining an IQ count value 320 for each of a number of instruction runs. In accordance with the described embodiment, the incoming stream of instructions received by the data processing apparatus is sectioned into a plurality of instruction runs, as illustrated schematically in FIG. 8. Each instruction run starts with one or more IQ instructions, followed by one or more shelf instructions. Accordingly, in the example shown in FIG. 8, run k contains the IQ instructions 450 followed by the shelf instructions 455, run k+1 includes the IQ instructions 460 followed by the shelf instructions 465, and run k+2 includes the IQ instructions 470 followed by the shelf instructions 475. The shelf instructions in any particular run must execute in order with respect to the IQ instructions of the same run. This check is performed using the IQ count value information 320, as will be discussed in more detail below. In addition, the shelf instructions in a particular run must operate in order with respect to all instructions of preceding runs. Given that the shelf instructions are placed in order within the shelf FIFO 40, this is automatically addressed by virtue of the run count mechanism maintained for each run, combined with the FIFO nature of the shelf FIFO. For example, considering run k+2, no shelf instruction within the block 475 can operate before the preceding shelf instructions 465 and 455 of the earlier runs have been issued. Further, within each run, the shelf instructions will only be issued when the IQ instructions of that run have been issued, and accordingly by using the shelf FIFO 40 in combination with the run count mechanism, this ensures that the shelf instructions are executed in order not only with respect to the IQ instructions of the same run, but also in order with respect to all instructions of preceding runs.

Returning to FIG. 5, it will be seen that each instruction in both the instruction queue 30 and the shelf FIFO 40 is labelled with a run number identifying which instruction run it belongs to. Further, the run management table 315 maintains an IQ run count value for each run.

Initially, each run count value is set to zero. As each instruction is dispatched into the instruction queue 30, the count value for the corresponding instruction run is incremented within the run management table. Then, as each instruction is issued by the issue select circuitry 55 from the instruction queue 30, the count value for the corresponding instruction run is decremented. For an instruction at the head of the shelf FIFO, the issue select circuitry 55 will ensure that that instruction cannot be issued unless the corresponding run count value 320 in the run management table is zero. This hence ensures that all of the IQ instructions within a particular run are issued before any shelf instructions in that run.

Considering the particular example of FIG. 5, the IQ run count value for the instruction run n0 is zero, and accordingly the instruction at the entry 302 in the shelf FIFO 300 is eligible to be issued. Through use of this run count mechanism, the WAR false hazard can be effectively checked and managed by the issue control circuitry 45.

In addition to the above types of false dependency, any shelf instruction must be constrained to only write back to its allocated physical register after all previous speculations are resolved. This is important, since in accordance with the described technique, a shelf instruction is not allocated a new physical register.

In the embodiment shown in FIG. 5, this is achieved through the management of resolution delay information within the run management table, in addition to storing delay information in association with each entry in the instruction queue 30 and shelf FIFO 40. Within the run management table, for each instruction run, the run management table maintains a resolution delay count value 325 identifying the remaining number of cycles until all outstanding speculations in relation to issued instructions from the associated instruction run have been resolved. Within each entry in the instruction queue 30 and the shelf FIFO 40, a delay indication is provided indicating a delay that is expected in relation to the associated instruction between issuing that instruction and that instruction reaching a predetermined stage of execution associated with speculation resolution. In the described embodiment, that predetermined stage is the write back stage, where the physical register will be overwritten.

As each instruction is issued by the issue control circuitry, whether from the shelf FIFO 40 or the instruction queue 30, then this causes the resolution delay count for the corresponding instruction run to be updated if that instruction's delay indication indicates a larger delay than the current resolution delay stored in the run management table. This delay is typically indicative of the latency of the functional unit to which the instruction is allocated for execution. In addition to updating the resolution delay for the associated instruction run, the resolution delay for all subsequent instruction runs is also updated with the new delay indication if that new delay indication is larger than the currently recorded resolution delay for the instruction run.

Within the shelf FIFO, the instruction at the head of the FIFO can only be issued if its delay indication is equal to or larger than the resolution delay value stored for the associated instruction run within the run management table 315.

Figure 9:
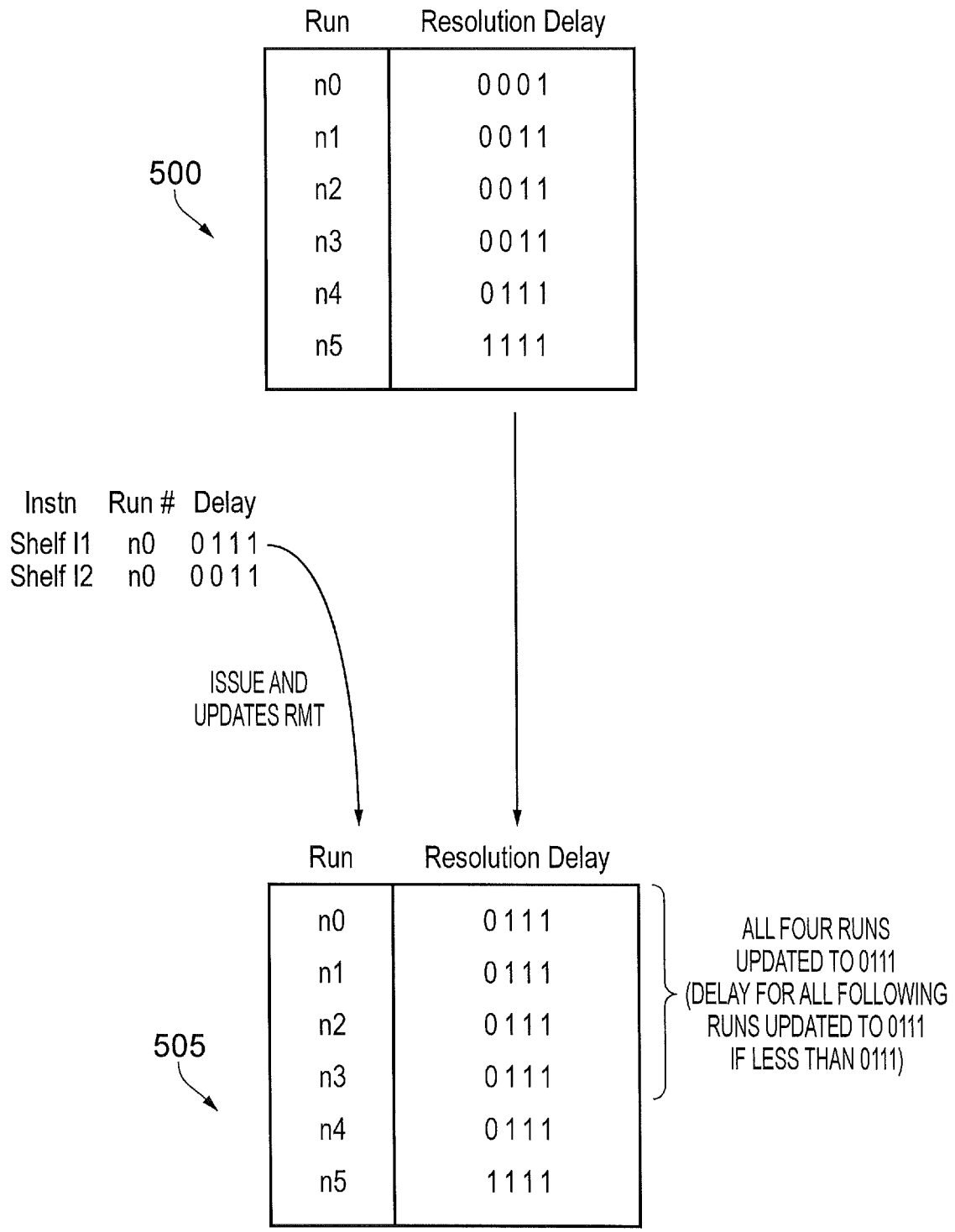
FIG. 9 illustrates how the resolution delay information is maintained within the run management table of FIG. 5 in accordance with one embodiment.

The above process is illustrated schematically in FIG. 9, where element 500 indicates the resolution delay information stored for an example sequence of instruction runs within the run management table. The first two entries within the shelf FIFO are also shown, and both those instructions I1 and I2 relate to instruction run n0. In principle, it is assumed that multiple instructions can be issued per cycle, and hence both of the instructions can be issued if their delay indication is larger than the resolution delay. In this example, this is the case, and accordingly both instructions are issued. The resolution delay for run n0 is then updated to the largest delay value from the two shelf instructions being issued, namely the delay 0111. In addition, all subsequent instruction runs that currently have a resolution delay less than 0111 are updated to the value 0111. Accordingly, the resultant modification to the resolution delay count values within the run management table is shown by the box 505.

Whilst the resolution information can be stored in a variety of formats, in one embodiment the values can be implemented with unary arithmetic to simplify the logic required for comparing and updating the resolution delays. In particular, the incrementing and decrementing can be performed by shift operations. Further, it is easy to implement the functionality where a new delay value is set for subsequent runs only if that new delay value is greater than the currently recorded delay value. In particular the columns down the table can be set to ones without having to do a greater-than comparison. In this embodiment, 0001 indicates a delay of one cycle, 0011 indicates a delay of two cycles, 0111 indicates a delay of three cycles, etc. It will be appreciated that in alternative embodiments the meanings of the logic 0 and logic 1 values can be reversed.

By use of the above resolution delay count mechanism, it can be ensured that for any instruction issued from the shelf FIFO, by the time that instruction reaches the write back stage of execution, any outstanding speculations will have been resolved. Accordingly, the instruction will only be allowed to write its result to the physical register if it has been determined that that instruction should in fact have been executed.

Returning to FIG. 5, it will be seen that when all of the above measures are taken into account by the bypassing logic 320, it will determine that the two instructions marked with an "*" will be issued in the current clock cycle. In particular, the second instruction in the shelf FIFO cannot be issued, even though it is associated with instruction run n0, and its source tag and previous destination tag are available, since its delay indication is less than the resolution delay value currently stored in association with instruction run n0. If it were to be issued, then this could cause a speculation hazard.

The ready bitvector information is read for the source and previous destination tags, and is written to for the destination tag. Accordingly, by way of example, when the instruction at the head of the shelf FIFO 300 (associated with the entry 302) is issued and subsequently executed, when its result is written to the physical register file, the destination tag p8 will be set.

Figure 6:
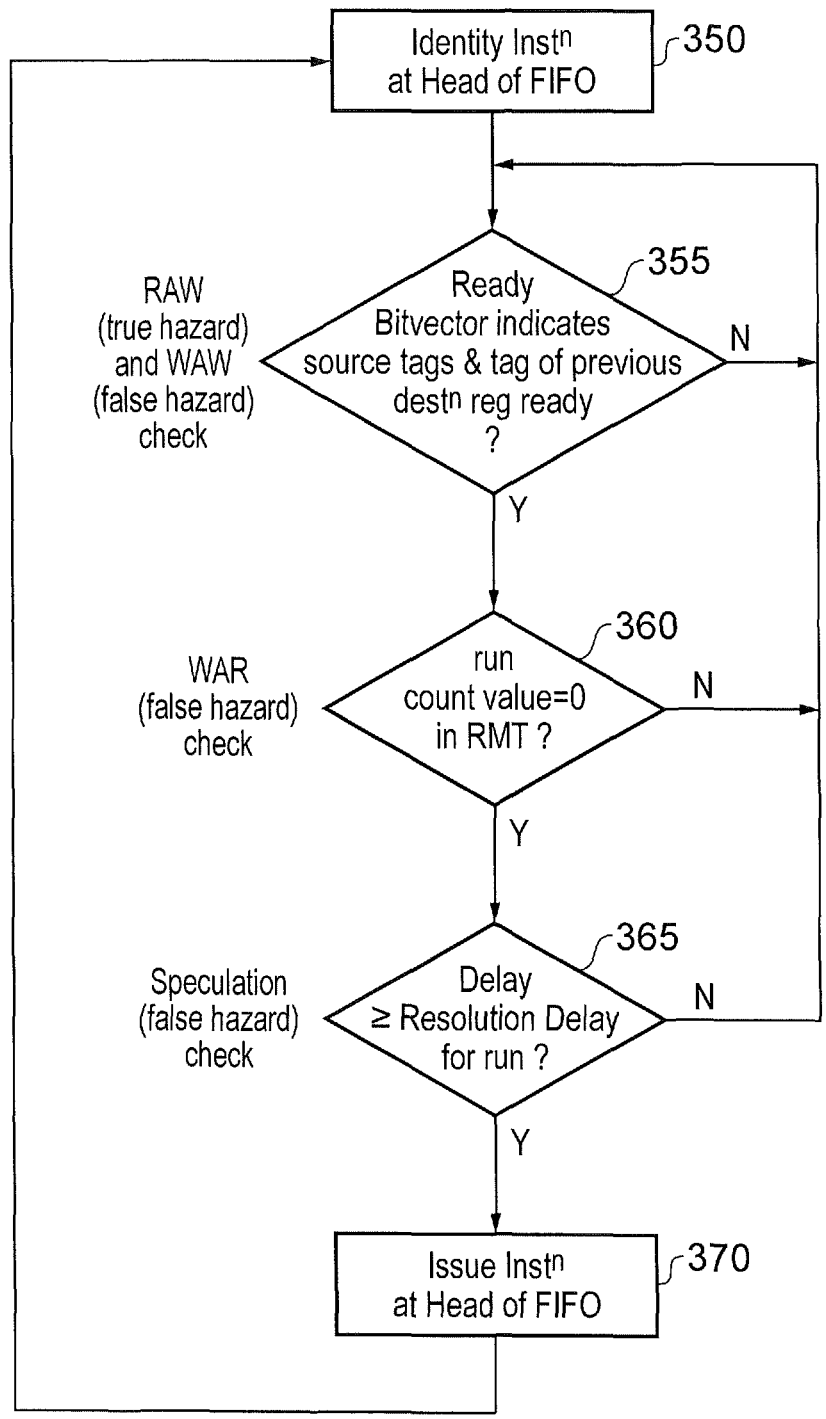
FIG. 6 is a flow diagram illustrating the operation of the circuitry of FIG. 5 when evaluating dependencies of an instruction at the head of the shelf FIFO, in accordance with one embodiment.

FIG. 6 is a flow diagram illustrating the checks performed by the bypassing logic 320 in respect of the instruction at the head of the shelf FIFO. At step 350, the instruction at the head of the shelf FIFO is identified. Thereafter, at step 355, it is checked whether the ready bitvector indicates that the source tags and the tag of the previous destination are ready. If they are, this indicates that both the RAW true hazard and the WAW false hazard no longer exist.

Assuming this condition is met, then at step 360, it is determined whether the run count value for the associated instruction run is zero in the run management table. If it is, then this means that the WAR false hazard no longer applies. Thereafter, at step 365, it is determined whether the delay indication is greater than or equal to the resolution delay stored in the run management table for the associated instruction run. If it is, then this means that the speculation hazard no longer applies. Provided that all three of the checks of steps 355, 360 and 365 are met, then it is safe to issue the instruction at the head of the shelf FIFO at step 370, whereafter the process returns to step 350 to consider the next instruction that is now at the head of the FIFO. If any of the checks of steps 355, 360 and 365 are not met, then the instruction cannot be issued, and the process returns to step 355 to consider all three steps again.

Whilst the steps 355, 360 and 365 have been shown sequentially in FIG. 6, it will be appreciated that those steps could be performed in parallel if desired.

As discussed earlier, another form of false hazard is the so called structural hazard. In accordance with the described techniques, this hazard is effectively addressed through use of the FIFO structure of the shelf FIFO 40, and accordingly no additional checks need to be performed by the issue control circuitry 45.

In the above described embodiments, a run management table 315 is used to maintain, for each of a number of instruction runs, an IQ count value 320, and a resolution delay value 325 identifying the remaining number of cycles until all outstanding speculations in relation to issued instructions from the associated instruction run have been resolved. However, in accordance with an alternative embodiment described below, the need for such a run management table can be removed, and alternative structures are instead used to implement equivalent functions.

The following discussion describes an embodiment which removes the need for maintaining IQ count values.

The FIFO shelf is designed to avoid costly associative operations like the tag comparison in the IQ. The shelf is implemented as a circular buffer with head and tail pointers, much like the reorder buffer (ROB). All shelf instructions will block behind a stalled head instruction even if they are ready to issue. Each instruction at the head of the shelf will check for false and true dependences before issuing to the functional units.

Figure 10A:
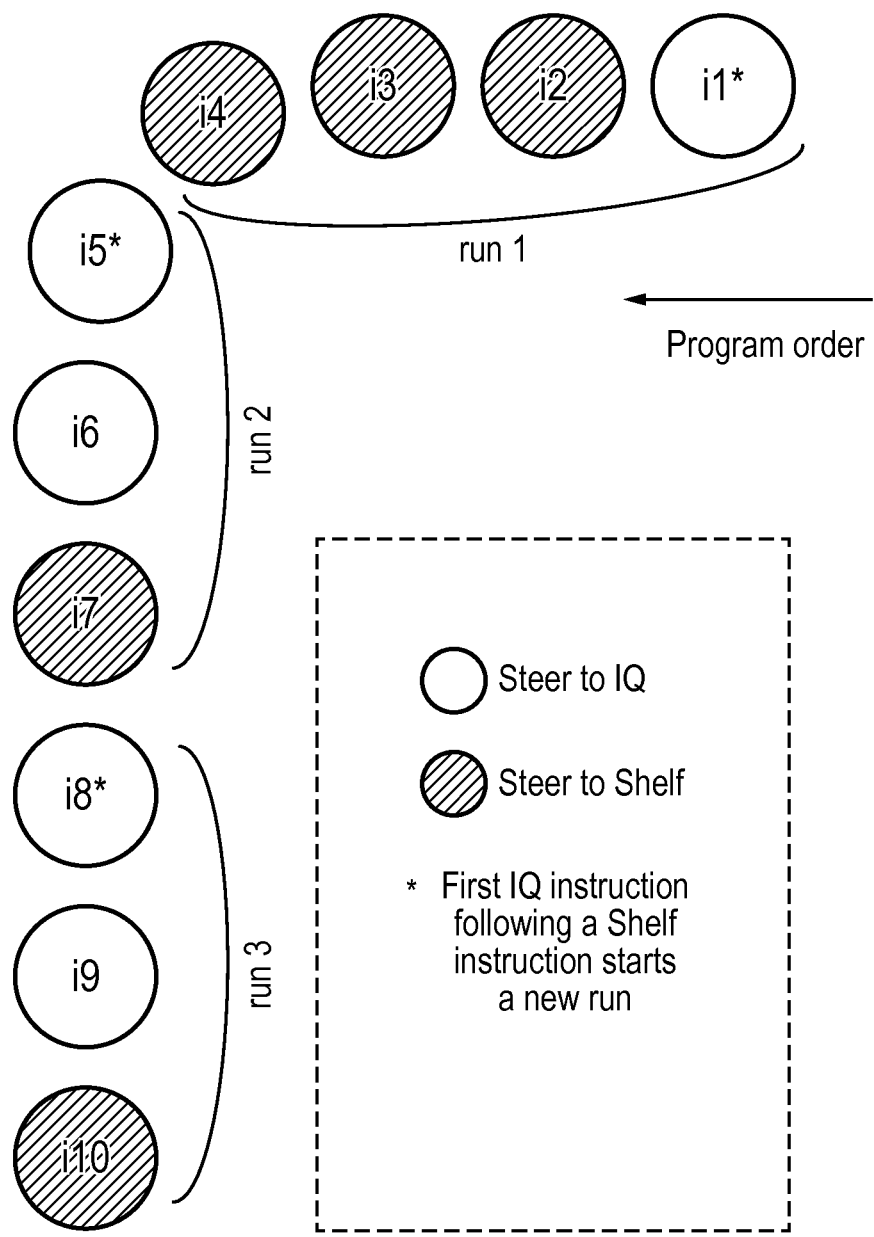
FIGS. 10A to 10C illustrate how a per-thread issue-tracking bitvector is used in one embodiment to track the issue order of IQ instructions.

To detect false dependences inexpensively, the invariant that instructions issue from the shelf in program order is maintained. The main implication of this invariant is that shelf instructions must issue after preceding IQ instructions. By virtue of the shelf being a FIFO buffer, its instructions are already ordered with respect to each other. So, an instruction at the head of the shelf need only stall for unissued instructions from the immediately preceding group of IQ instructions (earlier IQ instructions must have already issued for the shelf instruction to reach the head). For this reason, it is designated that a new run of instructions starts when an IQ instruction is steered immediately following a shelf instruction from the same thread. An example instruction stream with steering decisions is shown in FIG. 10A. An instruction at the head of the shelf that issues after all IQ instructions in the same run is guaranteed to issue in program order.

Figure 10B:
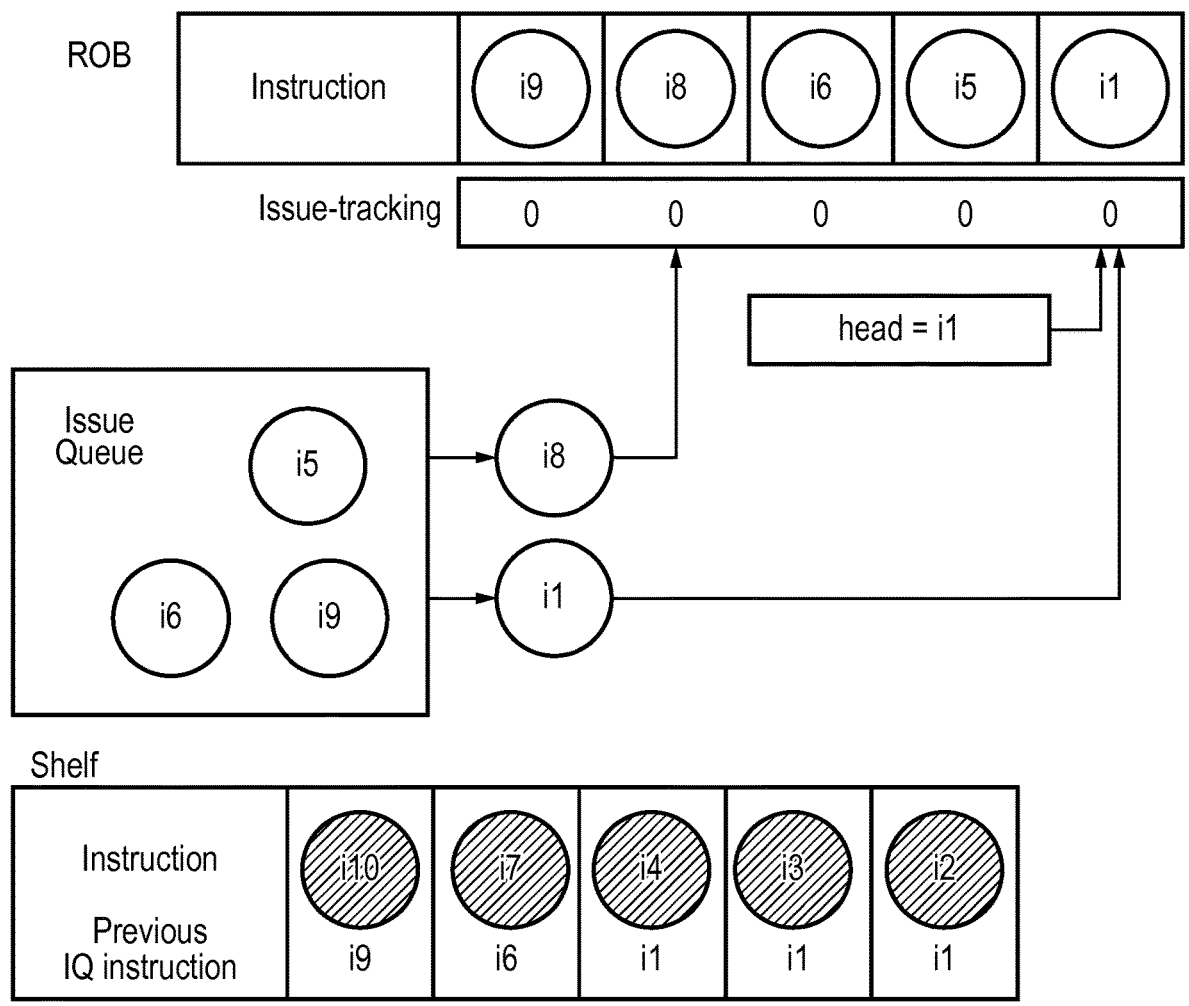
Figure 10C:
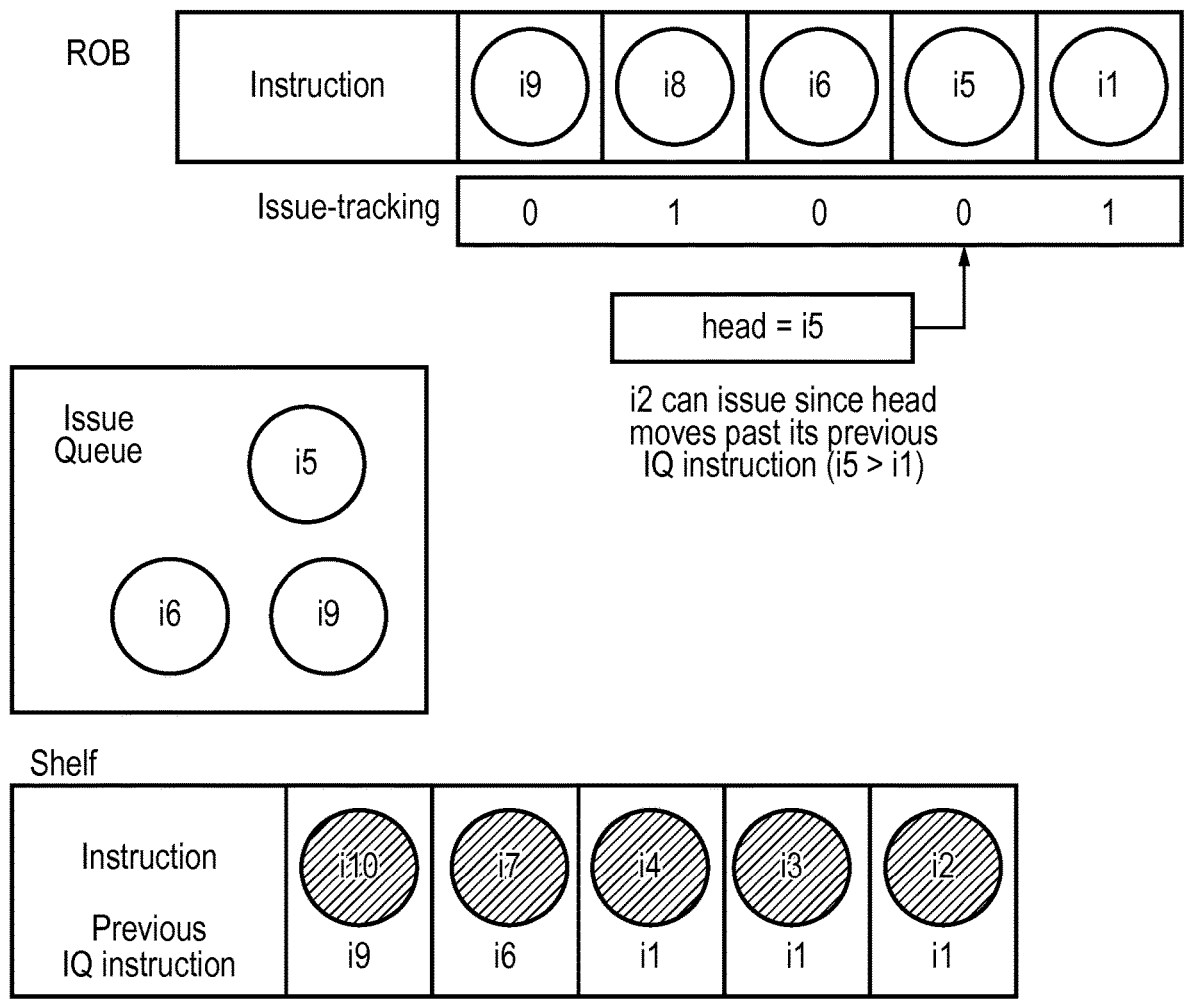

Since IQ instructions are dynamically scheduled, the first instruction to dispatch is not necessarily the first one to issue. Additionally, consecutive instructions are generally not allocated adjacent entries in an IQ. To track the issue order of IQ instructions, a per-thread issue-tracking bitvector is allocated with one bit per ROB entry, which represents whether the corresponding instruction has yet to issue (see FIG. 10B). The bit corresponding to an instruction is cleared upon dispatch, and set upon issue. A head pointer is maintained to track the oldest unissued IQ instruction, similarly to how the ROB tracks the oldest instruction that has not retired. In the example in FIG. 10C, as instructions i1 and i8 issue, the head pointer will move from i1 to the next IQ instruction, i5. To be eligible for issue, a shelf instruction must ensure that the head pointer has moved past the last IQ instruction preceding its run. So, as an instruction is dispatched to the shelf, it records the index of the last preceding IQ instruction (i.e. the tail pointer of the ROB/issue-tracking bitvector for its thread). Once the head pointer advances past this value, the shelf head is the eldest unissued instruction and can proceed to issue in program order.

The following discussion describes an embodiment that removes the need for maintaining a resolution delay value for every run.

In accordance with one embodiment, a technique to delay shelf instruction writeback correctly is implemented based on the result shift register proposed by Smith and Pleszkun in the context of in-order cores with varying but deterministic instruction execution latencies (as described in the article "Implementation of precise interrupts in pipelined processors", Proceedings of the 12th International Symposium on Computer Architecture (ISCA), June 1985 by J E Smith and A R Pleszkun). In particular, in one embodiment a speculation shift register (SSR) is introduced, which tracks the maximum remaining resolution cycles for any in-flight instruction. As each speculative instruction issues, it sets the SSR to the maximum of its resolution delay and the current SSR value. Since shelf instructions issue in program order, when the instruction at the head of the shelf is eligible for issue, the SSR will have been updated by all older instructions. A shelf instruction can only issue once its minimum execution latency compares less than or equal to the value in the SSR. Any earlier and it becomes unsafe to issue the shelf head (i.e. it could overwrite the value in its destination register, which is later needed for recovery).

Although the mechanism described thus far maintains precise state, it can unnecessarily delay shelf instructions due to speculative execution of younger reordered instructions (i.e. younger instructions steered to the IQ); such younger instructions may issue early, merging their resolution time into the SSR. In pathological cases, the shelf head may be the eldest incomplete instruction and yet stall indefinitely, until the issue of all younger instructions becomes blocked due to dependences on the shelf. (This pathology could not arise in Smith and Pleszkun's setting, where issue is in-order.) To avoid this pathology, in one embodiment additional SSRs are provisioned. Precise speculation stalls could be enforced by provisioning a separate SSR for each run; however, the number of in-flight runs varies greatly over the course of execution. Moreover, to support per-run SSRs, each IQ instruction would need to track which SSR it must update.

Figure 11:
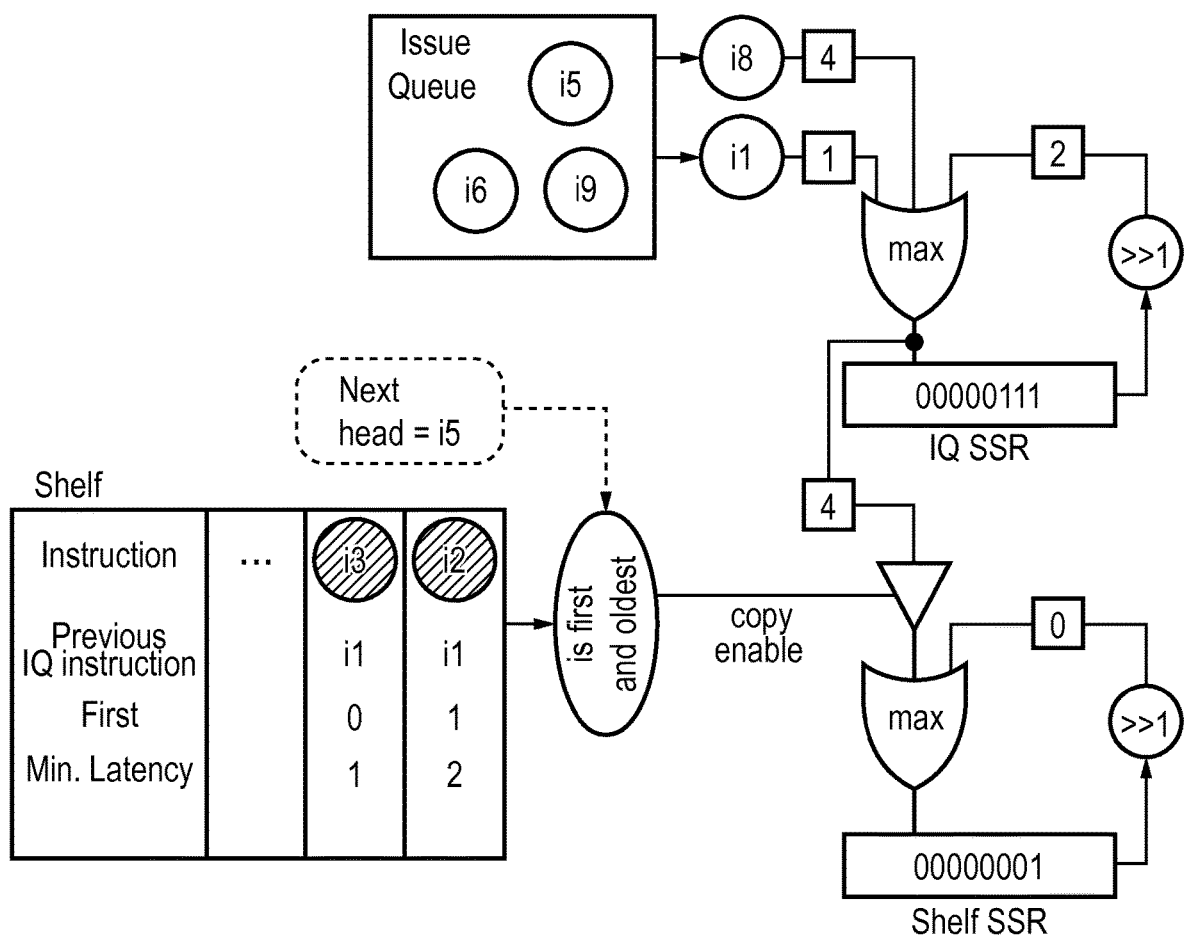
FIG. 11 illustrates the use of an IQ speculation shift register (SSR) and a shelf SSR in accordance with one embodiment.

Instead, in one embodiment the design has only two SSRs, an IQ SSR and a shelf SSR as shown in FIG. 11. All IQ instructions update only the IQ SSR with their resolution time as they issue. Shelf instructions refer only to the shelf SSR to determine if they are safe to issue. Whenever the first shelf instruction in a particular run becomes eligible for in-order issue, the IQ SSR is first copied to the shelf SSR. At this moment, it is guaranteed that all elder IQ instructions have issued and updated the SSR (as the shelf head is the eldest unissued instruction).

The IQ SSR may also include the resolution delay of younger instructions that issued early, for which a delay is (unnecessarily, but conservatively) enforced. However, the starvation pathology described above is no longer possible, since no more IQ instructions will affect the shelf SSR until the shelf head issues.

From the above described embodiments, it will be seen that such embodiments seek to alleviate the pressure on the out-of-order hardware components within a data processing apparatus, and provide a more energy efficient path for instructions. The described technique effectively increases the out-of-order instruction window size at a lower cost than scaling the out-of-order hardware. In particular, the described techniques allow a subset of instructions to forgo using out-of-order structures like the reorder buffer and issue queue, and instead execute using in order mechanisms. The described embodiments provide the mechanisms that allow these in order instructions to correctly bypass their true and false dependencies on the rest of the instructions, including those on the dynamically scheduled out-of-order window provided by the instructions in the instruction queue.

Although particular embodiments have been described herein, it will be appreciated that the invention is not limited thereto and that many modifications and additions thereto may be made within the scope of the invention. For example, various combinations of the features of the following dependent claims could be made with the features of the independent claims without departing from the scope of the present invention.

We claim:

1. A data processing apparatus for executing a stream of instructions out of order with respect to original program order, said stream including instructions that identify one or more architectural registers from a set of architectural registers, the data processing apparatus comprising:
   a plurality of out of order components configured to manage execution of a first subset of said instructions out of order, said plurality of out of order components configured to remove false dependencies between instructions in said first subset, and said plurality of out of order components including a first issue queue into which the instructions in said first subset are buffered prior to execution;
   a second issue queue into which a second subset of said instructions are buffered prior to execution, said second subset of instructions being constrained to execute in order; and
   issue control circuitry configured to reference both the first issue queue and the second issue queue in order to determine an order of execution of instructions from both the first and second issue queues, the issue control circuitry being configured to constrain the order of execution of said first subset of instructions only by true dependencies between the instructions in both the first and second issue queues, and to constrain the order of execution of said second subset of instructions by both the true dependencies and the false dependencies between the instructions in both the first and second issue queues,
   wherein:
   the stream of instructions is sectioned into a plurality of instruction runs, each instruction run comprising a block of instructions in original program order comprising one or more instructions in said first subset followed by one or more instructions in said second subset; and
   the issue control circuitry comprises a run management table maintaining data associated with each instruction run that is referenced by the issue control circuitry to determine for each instruction in said second issue queue, when one or more false dependencies no longer exist; and the run management table comprises a count value for each instruction run, as each instruction in the first subset is buffered in the first issue queue, the count value for a corresponding instruction run being adjusted in a first direction, and as each instruction is issued from the first issue queue for execution, the count value for the corresponding instruction run being adjusted in a second direction, and the issue control circuitry being configured to prevent an instruction in said second issue queue being issued for execution whilst the count value for the corresponding instruction run does not have a predetermined value, wherein the predetermined value indicates absence of the one or more false dependencies.

2. A data processing apparatus as claimed in claim 1, wherein: said plurality of out of order components further comprise a plurality of buffer entries, and renaming circuitry configured to map at least a subset of the one or more architectural registers in said set of architectural registers to buffer entries in said plurality of buffer entries, a number of buffer entries in said plurality of buffer entries exceeding the number of architectural registers in said at least a subset of the one or more architectural registers;

the data processing apparatus further comprising tag value generation circuitry configured to provide a plurality of tag values uniquely identifying each instruction in said first and second issue queues; and the issue control circuitry being configured to make reference to tag values for each instruction in order to constrain the order of execution of said first subset and said second subset of instructions.

3. A data processing apparatus as claimed in claim 2, wherein: the renaming circuitry is configured to map said subset of the one or more architectural registers to said buffer entries such that for multiple pending instructions in said first subset that specify a same destination architectural register those multiple instructions are allocated different destination buffer entries; and the renaming circuitry is further configured, for each instruction in said second subset, to map that instruction's specified destination architectural register to a same buffer entry last allocated to an instruction from said first subset that specified the same destination architectural register.

4. A data processing apparatus as claimed in claim 3, wherein a tag value generation circuitry forms part of the renaming circuitry.

5. A data processing apparatus as claimed in claim 4, wherein said renaming circuitry comprises:
a mapping table identifying architectural register to buffer entry mappings for pending instructions;
a free list identifying available buffer entries;
the mapping table further comprising, for each architectural register to buffer entry mapping, a corresponding tag value from said plurality of tag values to identify a most recent pending instruction associated with that buffer entry.

6. A data processing apparatus as claimed in claim 5, wherein if the most recent pending instruction associated with that buffer entry is an instruction from said first subset, a corresponding tag value is set equal to an identifier for that buffer entry.

7. A data processing apparatus as claimed in claim 5, wherein if the most recent pending instruction associated with that buffer entry is an instruction from said second subset, a corresponding tag value is set equal to an identifier value allocated to that instruction by the renaming circuitry to uniquely identify each pending instruction in said second issue queue.

8. A data processing apparatus as claimed in claim 7, wherein said renaming circuitry comprises:
a further free list of identifier values available to allocate to instructions in said second subset.

9. A data processing apparatus as claimed in claim 1, wherein said first issue queue is configured such that the issue control circuitry can select for execution any instruction buffered in said first issue queue that has no true dependencies remaining.

10. A data processing apparatus as claimed in claim 1, wherein said second issue queue is a first-in-first-out (FIFO) queue, and said issue control circuitry is configured to select for execution one or more instructions at a head of the FIFO queue once said one or more instructions have no true dependencies and no false dependencies remaining.

11. A data processing apparatus as claimed in claim 2, wherein the issue control circuitry is configured to maintain dependency data identifying dependencies for each instruction in said first and second issue queues, and is responsive to each instruction issued for execution from said first and second issues queues, to update the dependency data based on a tag value from said plurality of tag values of an issued instruction.

12. A data processing apparatus as claimed in claim 11, wherein: the issue control circuitry comprises a ready bitvector storage providing a ready indication for each tag value, the ready indication being set once an instruction identified by that tag value has produced its result, and being referenced by the issue control circuitry to determine, for each instruction from the second subset, when a true dependency in the form of a read after write (RAW) hazard no longer exists.

13. A data processing apparatus as claimed in claim 12, wherein:
the second issue queue is configured to store in association with each instruction both a tag value allocated for that instruction, and a tag value allocated for a preceding instruction that used a same buffer entry for a destination architectural register; and
the issue control circuitry is configured to reference the ready bitvector storage in order to determine, for each instruction in the second issue queue, when a false dependency in the form of a write after write (WAW) hazard no longer exists.

14. A data processing apparatus as claimed in claim 1, wherein the issue control circuitry is configured to reference the run management table in order to ensure an instruction in said second subset is not issued from the second issue queue until a false dependency in the form of a write after read (WAR) hazard no longer exists.

15. A data processing apparatus as claimed in claim 1, wherein said predetermined value is a zero value.

16. A data processing apparatus as claimed in claim 1, wherein said second issue queue is a first-in-first-out (FIFO) queue, and by configuring the issue control circuitry to prevent an instruction in said second issue queue being issued for execution whilst the count value for the corresponding instruction run does not have a predetermined value, this ensures that the issue control circuitry will not issue an instruction from a head position of the FIFO until a false dependency in the form of a write after read (WAR) hazard no longer exists.

17. A data processing apparatus as claimed in claim 1, wherein the issue control circuitry is configured to reference the run management table in order to ensure that an instruction in said second subset is not able to write back its result to a destination buffer entry until a false dependency in the form of an unresolved speculation no longer exists.

18. A data processing apparatus as claimed in claim 1, wherein:
the run management table comprises a delay count value for each instruction run, the delay count value identifying a remaining time until all outstanding speculations in relation to issued instructions from an associated instruction run have been resolved; and
the second issue queue maintains a delay indication for each instruction indicative of a delay between issuing that instruction and that instruction reaching a predetermined stage of execution associated with speculation resolution, the issue control circuitry being configured to prevent an instruction in said second issue queue being issued for execution if its associated delay indication is less than the delay count value for an instruction run to which that instruction belongs.

19. A data processing apparatus as claimed in claim 18, wherein both instructions in the first issue queue and instructions in the second issue queue have delay indications associated therewith, the issue control circuitry is configured to update the delay count value for an instruction run and all subsequent instruction runs if an instruction from that instruction run is issued for execution that has a delay indication larger than the current delay count value, and is further configured to decrement the delay count value each execution cycle.

20. A data processing apparatus as claimed in claim 2 wherein each buffer entry comprises a physical register within a physical register file.

21. A method of executing a stream of instructions out of order with respect to original program order within a data processing apparatus, said stream of instructions including instructions that identify one or more architectural registers from a set of architectural registers, the method comprising:
employing a plurality of out of order components to manage execution of a first subset of said instructions out of order, said plurality of out of order components configured to remove false dependencies between instructions in said first subset, and said plurality of out of order components including a first issue queue into which the instructions in said first subset are buffered prior to execution;
employing a second issue queue into which a second subset of said instructions are buffered prior to execution, said second subset of instructions being constrained to execute in order;
sectioning the stream of instructions into a plurality of instruction runs, each instruction run comprising a block of instructions in original program order comprising one or more instructions in said first subset followed by one or more instructions in said second subset, referencing both the first issue queue and the second issue queue in order to determine an order of execution of instructions from both the first and second issue queues, constraining the order of execution of said first subset of instructions only by true dependencies between the instructions in both the first and second issue queues, and constraining the order of execution of said second subset of instructions by both the true dependencies and the false dependencies between the instructions in both the first and second issue queues,
providing a run management table maintaining data associated with each instruction run that is referenced to determine for each instruction in said second issue queue, when one or more false dependencies no longer exist; and
maintaining in the run management table a count value for each instruction run, as each instruction in the first subset is buffered in the first issue queue, adjusting the count value for a corresponding instruction run in a first direction, and as each instruction is issued from the first issue queue for execution, adjusting the count value for the corresponding instruction run in a second direction, and preventing an instruction in said second issue queue being issued for execution whilst the count value for the corresponding instruction run does not have a predetermined value, wherein the predetermined value indicates absence of the one or more false dependencies.

22. A data processing apparatus for executing a stream of instructions out of order with respect to original program order, said stream of instructions including instructions that identify one or more architectural registers from a set of architectural registers, the data processing apparatus comprising:
a plurality of out of order component means for managing execution of a first subset of said instructions out of order, said plurality of out of order component means for removing false dependencies between instructions in said first subset;
said plurality of out of order component means including a first issue queue means into which the instructions in said first subset are buffered prior to execution;
a second issue queue means into which a second subset of said instructions are buffered prior to execution, said second subset of instructions being constrained to execute in order; and
issue control means for referencing both the first issue queue means and the second issue queue means in order to determine an order of execution of instructions from both the first and second issue queue means, the issue control means further for constraining the order of execution of said first subset of instructions only by true dependencies between the instructions in both the first and second issue queue means, and for constraining the order of execution of said second subset of instructions by both the true dependencies and the false dependencies between the instructions in both the first and second issue queue means,
wherein:
the stream of instructions is sectioned into a plurality of instruction runs, each instruction run comprising a block of instructions in original program order comprising one or more instructions in said first subset followed by one or more instructions in said second subset, and the issue control means comprises a run management table maintaining data associated with each instruction run that is referenced by the issue control means to determine for each instruction in said second issue queue means, when one or more false dependencies no longer exist, and the run management table comprises a count value for each instruction run, as each instruction in the first subset is buffered in the first issue queue means, the count value for a corresponding instruction run being adjusted in a first direction, and as each instruction is issued from the first issue queue means for execution, the count value for the corresponding instruction run being adjusted in a second direction, and the issue control means being configured to prevent an instruction in said second issue queue means being issued for execution whilst the count value for the corresponding instruction run does not have a predetermined value, wherein the predetermined value indicates absence of the one or more false dependencies.

* * * * *